(12) United States Patent
Nakahara

(10) Patent No.: US 7,420,697 B2
(45) Date of Patent: Sep. 2, 2008

(54) COMMUNICATION APPARATUS

(75) Inventor: Shigeki Nakahara, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 317 days.

(21) Appl. No.: 10/601,655

(22) Filed: Jun. 24, 2003

(65) Prior Publication Data

US 2004/0051910 A1 Mar. 18, 2004

Related U.S. Application Data

(62) Division of application No. 09/116,201, filed on Jul. 16, 1998, now Pat. No. 6,611,354.

(30) Foreign Application Priority Data

Jul. 23, 1997 (JP) ................... P9-197405

(51) Int. Cl.
G06F 15/00 (2006.01)
H04N 1/40 (2006.01)
H04N 1/46 (2006.01)

(52) U.S. Cl. ................. 358/1.15; 358/444; 358/501

(58) Field of Classification Search ............... 358/1.15, 358/442, 444, 404, 405, 440, 1.9, 400, 468, 358/434, 501; 101/2
See application file for complete search history.

(56) References Cited

U.S. PATENT DOCUMENTS

| 3,650,204 | A | * | 3/1972 | Burger et al. ............. 101/45 |
| 4,129,073 | A | * | 12/1978 | Ritzerfeld .................. 101/2 |
| 4,811,111 | A | * | 3/1989 | Kurokawa ................ 358/440 |
| 4,994,926 | A | | 2/1991 | Gordon et al. ........... 358/400 |
| 5,048,078 | A | * | 9/1991 | Satomi et al. ........ 379/102.02 |
| 5,128,985 | A | | 7/1992 | Yoshida et al. .......... 379/100 |
| 5,134,502 | A | | 7/1992 | Nakatsuma |
| 5,134,644 | A | | 7/1992 | Garton et al. ............. 379/39 |
| 5,175,762 | A | * | 12/1992 | Kochis et al. ......... 379/100.01 |
| 5,216,517 | A | | 6/1993 | Kinoshita et al. |
| 5,222,136 | A | | 6/1993 | Rasmussen et al. ......... 380/9 |
| RE34,429 | E | * | 11/1993 | Baran et al. ........... 379/100.11 |
| 5,269,503 | A | * | 12/1993 | Hiroi et al. ............. 270/58.09 |

(Continued)

FOREIGN PATENT DOCUMENTS

JP       61084659 A  *  4/1986

(Continued)

Primary Examiner—Madeleine A Nguyen
(74) Attorney, Agent, or Firm—Birch, Stewart, Kolasch & Birch, LLP

(57) ABSTRACT

A communication apparatus where transmission waiting time for an originating facsimile machine is shortened. A transmitter/receiver section of one of two communication control sections receives a transmission subscriber identification (TSI) signal from the originating facsimile machine. A determination new section extracts an international telephone number from the TSI signal and determines whether or not it coincides with a pre-stored international telephone number. If they coincide, the transmitter/receiver section receives an object signal in succession, otherwise the transmitter/receiver section ends the receiving operation without receiving the object signal. Further, when both communication control sections receive object signals at the same time, a line selecting section supplies the object signal received by the communication control section that has received an international telephone number that coincides with the pre-stored international telephone number to an image output section, prior to the object signal received by the other communication control section for printing a recording sheet.

2 Claims, 10 Drawing Sheets

U.S. PATENT DOCUMENTS

| | | | |
|---|---|---|---|
| 5,296,933 A * | 3/1994 | Nakatsuji | 358/400 |
| 5,299,026 A * | 3/1994 | Vincett et al. | 358/401 |
| 5,307,176 A * | 4/1994 | Dweck et al. | 358/403 |
| 5,349,447 A * | 9/1994 | Kuwahara et al. | 358/404 |
| 5,369,501 A * | 11/1994 | Wilson et al. | 358/407 |
| 5,404,805 A * | 4/1995 | Fujimoto et al. | 101/118 |
| 5,406,387 A | 4/1995 | Yamamoto | 358/407 |
| 5,408,520 A * | 4/1995 | Clark et al. | 379/93.07 |
| 5,428,462 A * | 6/1995 | Kim et al. | 358/462 |
| 5,444,779 A * | 8/1995 | Daniele | 399/366 |
| 5,488,651 A * | 1/1996 | Giler et al. | 379/100.14 |
| 5,565,964 A * | 10/1996 | Tashiro et al. | 399/83 |
| 5,579,472 A | 11/1996 | Keyworth, II et al. | 358/407 |
| 5,592,307 A * | 1/1997 | Murai | 358/468 |
| 5,684,864 A * | 11/1997 | Shibata | 379/100.01 |
| 5,701,183 A | 12/1997 | Bellemare et al. | 358/404 |
| 5,717,506 A * | 2/1998 | Yamamoto et al. | 358/523 |
| 5,727,082 A * | 3/1998 | Sugishima | 382/229 |
| 5,729,354 A * | 3/1998 | Sugawara et al. | 358/406 |
| 5,764,918 A | 6/1998 | Poulter | 395/200.66 |
| 5,828,466 A * | 10/1998 | Imai et al. | 358/404 |
| 5,847,843 A * | 12/1998 | Shibata et al. | 358/440 |
| 5,864,560 A * | 1/1999 | Li et al. | 370/465 |
| 5,872,641 A * | 2/1999 | Ozeki et al. | 358/434 |
| 5,936,744 A | 8/1999 | Choi | 358/440 |
| 5,946,106 A * | 8/1999 | Itoh et al. | 358/442 |
| 5,963,340 A | 10/1999 | Kim | 358/440 |
| 5,991,052 A * | 11/1999 | Hobo | 358/407 |
| 6,038,424 A * | 3/2000 | Nakagawa | 399/367 |
| 6,073,013 A * | 6/2000 | Agre et al. | 455/428 |
| 6,122,066 A * | 9/2000 | Hobo | 358/1.15 |
| 6,137,877 A * | 10/2000 | Robin et al. | 379/352 |
| 6,208,434 B1 * | 3/2001 | Minamizawa | 358/468 |
| 6,239,881 B1 | 5/2001 | Shaffer et al. | 358/440 |
| 6,310,948 B1 * | 10/2001 | Nemeth | 379/213.01 |
| 6,323,962 B1 * | 11/2001 | Itoh et al. | 358/468 |
| 6,343,263 B1 * | 1/2002 | Nichols et al. | 702/189 |
| 6,370,239 B1 * | 4/2002 | Le et al. | 379/100.09 |
| 6,424,711 B1 * | 7/2002 | Bayless et al. | 379/355.09 |
| 6,965,459 B2 * | 11/2005 | Sugawara et al. | 358/407 |

FOREIGN PATENT DOCUMENTS

| | | |
|---|---|---|
| JP | 64-77278 A | 3/1989 |
| JP | 02-065439 | 3/1990 |
| JP | 03-169158 | 7/1991 |
| JP | 423673 A | 1/1992 |
| JP | 04-199964 | 7/1992 |
| JP | 05-030254 | 2/1993 |
| JP | 05-063934 | 3/1993 |
| JP | 05-145662 | 6/1993 |
| JP | 5219275 A | 8/1993 |
| JP | 05-236220 | 9/1993 |
| JP | 09-163063 | 6/1997 |

* cited by examiner

COMMUNICATION APPARATUS

This application is a divisional of application Ser. No. 09/116,201, filed on Jul. 16, 1998, now U.S. Pat. No. 6,611,354 the entire contents of which are hereby incorporated by reference and for which priority is claimed under 35 U.S.C. § 120; and this application claims priority of application Ser. No. 9-197405 filed in JAPAN on Jul. 23, 1997 under 35 U.S.C. § 119.

BACKGROUND OF THE INVENTION

1. Field of the Invention

The present invention relates to a communication apparatus to which a plurality of public lines are connected and which is capable of transmitting/receiving signals by switching the lines.

2. Description of the Related Art

Hitherto, only one public line has been stored in a facsimile machine. Because the public line is occupied when either one of operations of transmitting image signals from one facsimile machine to a destination facsimile machine, or receiving image signals transmitted from an originating facsimile machine, it has been difficult to perform either one of the operations when performing the other operation. Accordingly, a facsimile machine other than the destination or originating facsimile machine cannot transmit image signals to the one facsimile machine during when it transmits/receives image signals. Therefore, transmission waiting time of the other facsimile machine has been prolonged in the case described above.

To overcome the above, technologies for storing a plurality of public lines in one facsimile machine have been developed in order to receive/transmit image signals in parallel by a single facsimile machine. As prior art technologies of this sort, there have been facsimile machines disclosed in Japanese Unexamined Patent Publications JP-A 4-23673(1992) and 5-219275(1993). The facsimile machine in JP-A 4-23673 transmits the same image signals to a plurality of facsimile machines by means of the so-called multi-address calling. At this time, the operation for transmitting to each destination is initiated by shifting transmission times, by a predetermined time, in order to prevent all lines that are stored in the facsimile machine from being used at the same time for the transmission of the image signals. The facsimile machine disclosed in JP-A 5-219275 (1993) portions out the stored plurality of lines into lines to be used for transmission and lines for receiving corresponding to a factor of use of the lines. Although the facsimile machine storing the plurality of public lines has been thus arranged so that all of the stored lines are not used at the same time, all of the lines are still used at the same time when an unspecified number of calls to be received are concentrated in all of the lines. This causes a transmission waiting state.

SUMMARY OF THE INVENTION

Accordingly, it is an object of the present invention to provide a communication apparatus including a facsimile machine whose manipulation can be simplified and whose time required for communication, including a transmission waiting time, can be shortened.

In a first aspect of the invention, a communication apparatus comprises receiving means for receiving an identification signal for identifying an originating communication apparatus which transmits an object signal to be transmitted/received; storage means for storing an identification signal of a predetermined originating communication apparatus; and determination means for determining whether or not the identification signal stored in the storage means coincides with the identification signal received by the receiving means, wherein when it is determined by the determining means that the identification signals coincide with each other, the receiving means performs a first receiving operation related to receiving of the object signal, and when it is determined by the determination means that the identification signals do not coincide with each other, the receiving means performs a second receiving operation different from the first receiving operation.

According to the first aspect of the invention, the communication apparatus stores an identification signal of a predetermined originating communication apparatus which is permitted to perform communication with the communication apparatus for example, in the storage means in advance. This identification signal is an international telephone number contained in a transmitting subscriber identification signal when the communication apparatus is a facsimile machine for example. In receiving the object signal from the originating communication apparatus, the communication apparatus determines whether or not the identification signal from the originating communication apparatus coincides with the identification signal stored in the storage means before receiving the object signal and changes the receiving operation of the receiving means in receiving the object signal depending on whether the identification signals coincide with each other or not.

For instance, when the inventive communication apparatus is capable of communicating with an unspecified number of originating communication apparatuses and an operator thereof desires the communication apparatus to perform the predetermined receiving operation only when it receives the object signal from the predetermined originating communication apparatus, the predetermined receiving operation is set as the first receiving operation and the general receiving operation is set as the second receiving operation in advance. Thereby, the communication apparatus automatically performs the predetermined receiving operation when it communicates with the predetermined originating communication apparatus and automatically performs the general receiving operation when it communicates with the one other than the predetermined originating communication apparatus among the unspecified number of originating communication apparatuses.

As described above, according to the first aspect of the invention, the communication apparatus switches the receiving operations depending on whether or not the identification signal of the originating communication apparatus coincides with the predetermined identification signal. Accordingly, the receiving operation for the predetermined originating communication apparatus and the receiving operation for the other unspecified number of originating communication apparatuses may be switched readily. Further, the receiving operation may be automatically changed without requiring an operation of changing the receiving operation which is otherwise manually performed by an operator who discerns the originating communication apparatus from the identification signal. Therefore, the manipulation of the communication apparatus may be simplified. Still more, because the two kinds of receiving operations may be performed by one communication apparatus, communication apparatuses for performing the respective receiving operations need not be provided separately. Thereby, a number of communication apparatuses prepared on the object signal receiving side may be reduced.

In a second aspect of the invention, a communication apparatus comprises a plurality of receiving means for receiving an identification signal for identifying an originating communication apparatus which transmits an object signal to be transmitted/received; storage means for storing an identification signal of a predetermined originating communication apparatus; determining means for determining whether or not the identification signal stored in the storage means coincides with the identification signal received by each receiving means; and output means for outputting the object signal received by the plurality of receiving means, by a predetermined first output operation, when the identification signal received by at least one receiving means is determined to coincide with the identification signal stored in the storage means, by the determination means, and for outputting the object signal received by the plurality of receiving means, by a predetermined second output operation different from the first output operation, when the identification signal received by each receiving means is determined not to coincide with the identification signal stored in the storage means, by the determination means.

According to the second aspect of the invention, the communication apparatus stores an identification signal of a predetermined originating communication apparatus which is permitted to perform communication with the communication apparatus for example, in the storage means in advance. In receiving the object signals from the plurality of originating communication apparatuses separately by each receiving means, the communication apparatus determines whether or not the identification signal from the originating communication apparatus coincides with the identification signal stored in the storage means before receiving the object signals and changes the operation for outputting the object signal received by each receiving means depending on whether or not the identification signals coincide with each other.

For instance, when the inventive communication apparatus is capable of communicating with an unspecified number of originating communication apparatus and an operator thereof desires the communication apparatus to perform the predetermined output operation only when the object signal from the predetermined originating communication apparatus is contained among the receive object signals, the predetermined output operation is set as the first receiving operation and the general output operation is set as the second receiving operation in advance. Thereby, when the communication apparatus communicates with the unspecified number of originating communication apparatuses, the communication apparatus automatically performs the predetermined output operation when the predetermined originating communication apparatus is contained among them and automatically performs the general receiving operation when the predetermined originating communication apparatus is not contained therein.

Further, according to the second aspect of the invention, the communication apparatus switches the operations for outputting the received object signal depending on whether or not the identification signal of the originating communication apparatus coincides with the predetermined identification signal. Accordingly, the operation for outputting the object signals from the unspecified number of originating communication apparatus including the predetermined originating communication apparatus and the operation for outputting the object signals from the unspecified number of originating communication apparatus not including the predetermined originating communication apparatus may be readily switched. Further, the receiving operation may be automatically changed without requiring an operation of changing the output operation which is otherwise manually performed by an operator who discerns each originating communication apparatus from the identification signal. Therefore, the manipulation of the communication apparatus may be simplified. Still more, because the two kinds of output operations may be performed by one communication apparatus, communication apparatuses for performing the respective output operations need not be provided separately. Thereby, a number of communication apparatuses prepared on the object signal receiving side may be reduced.

In a third aspect of the invention, a communication apparatus comprises a plurality of receiving means for receiving an identification signal for identifying an originating communication apparatus which transmits an object signal to be transmitted/received; storage means for storing an identification signal of a predetermined originating communication apparatus; determination means for determining whether or not the identification signal stored in the storage means coincides with the identification signal received by each receiving means; and output means for outputting the object signal received by the plurality of receiving means, by a predetermined first output operation, when the identification signal received by at least one receiving means is determined to coincide with the identification signal stored in the storage means, by the determination means, and for outputting the object signal received by the plurality of receiving means, by a predetermined second output operation different from the first output operation, when the identification signal received by each receiving means is determined not to coincide with the identification signal stored in the storage means, by the determination means, wherein when it is determined by the determination means that the identification signals coincide with each other, at least one receiving means among the plurality of receiving means performs a first receiving operation related to receiving of the object signal, and when it is determined by the determination means that the identification signals do not coincide with each other, the receiving means performs a second receiving operation different from the first receiving operation.

According to the third aspect of the invention, the inventive communication apparatus is what the receiving means of the communication apparatus of the first aspect is applied to at least one receiving means among the plurality of receiving means of the communication apparatus of the second aspect. In this apparatus, at least one receiving means among all of the receiving means switches the receiving operation corresponding to the received identification signal and switches the operation for outputting the object signal received by each receiving means depending on whether or not there is receiving means, among the plurality of receiving means, which has received the predetermined identification signal.

Thereby, the receiving operation for the predetermined originating communication apparatus and the receiving operation for the other unspecified number of originating communication apparatuses may be automatically and readily switched and the output operation of the object signals from the unspecified number of originating communication apparatuses including the predetermined originating communication apparatus and the output operation of the object signals from the unspecified number of originating communication apparatuses not including the predetermined originating communication apparatus may be also automatically and readily switched. Accordingly, the usability of the communication apparatus may be improved further.

Further, the communication apparatus of the third aspect has the plurality of receiving means. It is then possible to arrange such that only part of those receiving means switches the receiving operation by the identification signal as described above and the remaining receiving means other than the partial receiving means among all of the receiving means operate regardless of the identification signal. At this time, the remaining receiving means can receive the object signals from the unspecified number of originating communication apparatuses, respectively. Thereby, the function of the prior art communication apparatus which performs the general receiving operation and that of the communication apparatus which changes its receiving operation depending on whether or not the identification signals coincide with each other may be achieved by one communication apparatus. Thereby, because the communication apparatus which performs the two kinds of receiving operations by itself may be realized, a number of communication apparatuses to be prepared on the receiving side may be reduced.

Further, according to the third aspect of the invention, the communication apparatus switches the output operation of the received object signal depending on whether or not the identification signal of the originating communication apparatus coincides with the predetermined identification signal and switches the receiving operation depending on whether or not the identification signal of the originating communication apparatus coincides with the predetermined identification signal by at least one receiving means among the plurality of receiving means. Thereby, the receiving operation and the output operation may be automatically and readily switched, so that the usability of the communication apparatus may be improved further.

In a fourth aspect of the invention, in the communication apparatus of the first or third aspect, the first receiving operation is an operation for causing the receiving means to continuously communicate with the originating communication apparatus to receive the object signal, and the second receiving operation is an operation for causing the receiving means to end the communication without receiving the object signal from the originating communication apparatus.

According to the fourth aspect of the invention, the first and second receiving operations are performed as described above. When this invention is applied to the invention of the first aspect, the receiving means determines an identification signal at first when the communication is started with an originating communication apparatus, continues the communication to receive the object signal when its identification signal coincides with the stored identification signal and ends the communication before receiving the object signal when the identification signal does not coincide with the stored identification signal. Accordingly, the receiving means automatically rejects to receive the object signal from the unspecified number of originating communication apparatuses other than the originating communication apparatus identified by the stored identification signal. Thereby, this receiving means operates as receiving means dedicated for receiving the object signal from the originating communication apparatus identified by the stored identification signal.

Accordingly, when the originating communication apparatus transmits the object signal to the communication apparatus of the fourth aspect, the communication apparatus receives the identification signal and the object signal from the originating communication apparatus instantly because the receiving means is always opened because it receives no object signal from the other unspecified number of originating communication apparatuses. Accordingly, when the originating communication apparatus transmits the object signal to the inventive communication apparatus, a transmission waiting time from a point of time when the originating communication apparatus starts the transmitting operation until a point of time when the object signal can be actually transmitted between the originating communication apparatus and the inventive communication apparatus may be shortened as compared to the prior art communication apparatuses.

Further, when this receiving operation is applied to the communicating apparatus of the third aspect, at least one of the plurality of receiving means of the communication apparatus switches between to continue and not to continue the communication depending on whether or not the identification signals coincide with each other the same as the receiving means of the communication apparatus which is obtained by applying the fourth aspect to the communication apparatus of the first aspect. In the communication apparatus, only part of the plurality of receiving means switches whether or not to continue the communication by the identification signal as described above and the remaining receiving means other than the part of the receiving means among the plurality of receiving means can operate regardless of the identification signal.

Thereby, the communication apparatus can receive the object signal from the unspecified number of originating communication apparatuses by the remaining receiving means. Further, when transmitting means is added to the communication apparatus, the object signal may be transmitted from this communication apparatus. Accordingly, the communication apparatus of the fourth aspect can achieve the functions of the communication apparatus dedicated for receiving the object signal from the predetermined originating communication apparatus and of the general purpose communication apparatus just by itself. Accordingly, the use of the communication apparatus allows communication to be performed similarly to the prior art communication apparatus and the transmission waiting time of the specific originating communication apparatus to be shortened. Thereby, the usability of the communication apparatus may be improved further.

In a fifth aspect of the invention, in addition to the apparatus of the first aspect, the communication apparatus further comprises transmitting means for transmitting the object signal to a transferred communication apparatus capable of receiving the object signal, and the first receiving operation is an operation for receiving the object signal transmitted from the originating communication apparatus and for transmitting the received object signal to the transmitting means and the second receiving operation is an operation for receiving and outputting the object signal transmitted from the originating communication apparatus.

According to the fifth aspect of the invention, the first and second receiving operations of the inventive communication apparatus are performed as described above. When a communication with an originating communication apparatus is started, the receiving means determines an identification signal at first and then receives and outputs the object signal when the identification signal coincides with the stored identification signal. When the identification signal does not coincide with the stored identification signal, the receiving means receives the object signal and supplies it to the transmitting means to transmit to the transferred communication apparatus. Accordingly, each receiving means transfers the object signal from the originating communication apparatus identified by the stored identification signal automatically to the transferred communication apparatus.

Thereby, this communication apparatus operates as a relay communication apparatus between the originating communication apparatus identified by the stored identification signal and the transferred communication apparatus. Accordingly, the object signal is transmitted automatically without requiring the manipulation for transferring the object signal which is otherwise performed by an operator of the communication apparatus of the fifth aspect. Accordingly, the manipulation performed by the operator may be simplified because the operator is not required to manipulate the communication apparatus to operate the communication apparatus of the fifth aspect as the relay communication apparatus.

Further, according to the fifth aspect of the invention, the communication apparatus outputs the object signal as it is when the identification signal of the originating communication apparatus does not coincides with the predetermined identification signal and transfers the object signal to the transferred communication apparatus when the identification signals coincide with each other. Accordingly, each receiving means transfers the object signal from the originating communication apparatus identified by the stored identification signal automatically to the transferred communication apparatus. Thereby, the manipulation performed by the operator in transferring the object signal may be simplified.

In a sixth aspect of the invention, in addition to the apparatus of the third aspect, the communication apparatus further comprises transmitting means for transmitting an object signal to a transferred communication apparatus capable of receiving the object signal and the first receiving operation is an operation for receiving the object signal transmitted from the originating communication apparatus and for transmitting the received object signal to the transmitting means, and the second receiving operation is an operation for receiving the object signal transmitted from the originating communication apparatus and for supplying the received object signal to the output means.

According to the sixth aspect of the invention, the first and second receiving operations of the inventive communication apparatus are performed as described above. Accordingly, at least one of the plurality of receiving means of the communication apparatus switches whether or not to transfer the object signal to the transferred communication apparatus depending on whether or not the identification signals coincide with each other, the same as the receiving means of the communication apparatus of the fifth aspect. In the communication apparatus, only part of the receiving means among the plurality of receiving means switches whether or not to transfer the object signal by the identification signal as described above and the remaining receiving means can operate regardless of the identification signal and output the object signal from the unspecified number of originating communication apparatuses as it is.

Thereby, the communication apparatus can output all of the object signals from the unspecified number of originating communication apparatuses by the remaining receiving means. Accordingly, the communication apparatus of the sixth aspect achieves the functions of the communication apparatus dedicated for relaying the object signal from the predetermined originating communication apparatus and of the general purpose communication apparatus just by itself. Accordingly, the use of the communication apparatus allows the communication to be performed similarly to the prior art communication apparatus and the manipulation for the transfer may be simplified. Thereby, the usability of the communication apparatus may be improved further.

In a seventh aspect of the invention, in addition to the apparatus of the first or third aspect, the communication apparatus further comprises printing means for printing the object signal to a recording sheet; and supplying means for supplying one type of recording sheet among a plurality of types of recording sheets whose shape and size are different to the printing means, and the first receiving operation is an operation for receiving the object signal transmitted from the originating communication apparatus, for supplying a predetermined type of recording sheet among the plurality of types of recording sheets from the supplying means to the printing means and for causing the printing means to print the object signal on the supplied recording sheet, and the second receiving operation is an operation for receiving the object signal transmitted from the originating communication apparatus, for supplying any one type of recording sheet among the plurality of types of recording sheets from the supplying means to the printing means and for causing the printing means to print the object signal on the supplied recording sheet.

According to the seventh aspect of the invention, the first and second receiving operations of the inventive communication apparatus are performed as described above. When the communication apparatus of the seventh aspect is constructed on the basis of the communication apparatus of the first aspect, the receiving means determines an identification signal at first when a communication is started with an originating communication apparatus and causes the supplying means to supply the predetermined type of recording sheet to the printing means. When the identification signal does not coincide with the stored identification signal, it causes the supplying means to supply any one type of recording sheet among the plurality of types of recording sheets to the printing means. The receiving means supplies the object signal to the printing means to print the object signal on the recording sheet supplied from the supplying means. Accordingly, the object signal from the originating communication apparatus identified by the stored identification signal is printed automatically on the predetermined type of recording sheet. Accordingly, the recording sheet is automatically selected without requiring the operator of the communication apparatus of the seventh aspect to conduct an operation for switching the types of recording sheet. Therefore, the operations conducted by the operator may be simplified.

Further, when the communication apparatus of the seventh aspect is constructed on the basis of the communication apparatus of the third aspect, at least one of the plurality of receiving means of the communication apparatus switches the type of recording sheet on which the object signal is to be printed, depending on whether or not the identification signals coincide with each other, the same as the receiving means of the communication apparatus constructed on the basis of the communication apparatus of the first aspect. Further, the recording sheet may be selected corresponding to the identification signal as described above only by part of the receiving means among the plurality of receiving means and the recording sheet may be selected regardless of the identification signal by the remaining receiving means in this communication apparatus.

As described above, the communication apparatus of the seventh aspect prints the object signal on a recording sheet of a predetermined type when the identification signal of the originating communication apparatus coincides with a predetermined identification signal and prints the object signal on a recording sheet of an arbitrary type when they do not coincide. Accordingly, the recording sheet is automatically selected without requiring the operator of the communication apparatus of the seventh aspect to conduct the operation for switching the types of recording sheet. Therefore, the operations conducted by the operator may be simplified. Accordingly, the inventive communication apparatus can achieve the functions of the communication apparatus which prints the object signal from the predetermined originating communication apparatus on the recording sheet of a predetermined type and of the general purpose communication apparatus by itself. Accordingly, the use of this communication apparatus allows communication to be performed similarly to the prior art communication apparatus and the manipulation for selecting the recording sheet to be simplified. Thereby, the usability of the communication apparatus may be improved further.

In an eighth aspect of the invention, in the communication aspect of the second or third aspect, the first output operation is an operation for outputting the object signal received by the receiving means which has received the identification signal which coincides with the identification signal stored in the storage means among the plurality of receiving means prior to the object signal received by the remaining receiving means other than the receiving means which has received the coincident identification signal among the plurality of receiving means, and the second output operation is an operation for outputting the object signals received by each receiving means in a predetermined sequence.

According to the eighth aspect of the invention, the first and second output operations are performed as described above. That is, when the plurality of receiving means start to communicate in the same time, the output means checks whether or not the identification signal received by each receiving means coincides with the stored identification signal and when there is the coincident identification signal, outputs the object signal received by the receiving means which has received the identification signal prior to the object signal received by the remaining receiving means other than the receiving means which has received the coincident identification signal among all of the receiving means. Further, when the identification signals received by all of the receiving means do not coincide with the stored identification signals, the output means outputs the object signals received by each receiving means in a predetermined sequence.

As described above, according to the eighth aspect of the invention, when the identification signal received by either one receiving means coincides with the predetermined identification signal, the communication apparatus outputs the object signal received by the receiving means which has received the identification signal prior to the object signal received by the remaining receiving means. Thereby, in the case where the output operation of the communication apparatus of the eighth aspect is applied to the communication apparatus of the second or third aspect, when an object signal is transmitted from a predetermined originating communication apparatus, the output means outputs the object signal prior to object signals from the other unspecified number of originating communication apparatuses. Thereby, when the object signal is transmitted from the predetermined originating communication apparatus to the communication apparatus, an output waiting time from a point of time when the object signal is received until a point of time when the object signal is actually output may be shortened. Accordingly, the time required for the communication between the originating communication apparatus and the communication apparatus of the eighth aspect may be shortened.

In a ninth aspect of the invention, in the apparatus of the second or third aspect, identification signals of a plurality of originating communication apparatuses are stored in the storage means, the first output operation is an operation for collecting and outputting object signals received by the receiving means which has received the identification signal which coincides with the identification signal stored in the storage means among the plurality of receiving means, and the second output operation is an operation for outputting the object signals received by each receiving means separately.

According to the ninth aspect of the invention, the first and second output operations of the inventive communication apparatus are performed as described above. When the plurality of receiving means start to communicate in the same time, the output means checks whether or not the identification signal received by each receiving means coincides with any one of the stored plurality of identification signals and when the identification signal received by each of the plurality of receiving means coincides with any one of the stored identification signals, collects and outputs the object signals received by those receiving means. When the identification signals received by all of the receiving means do not coincide with all of the stored identification signals, the output means outputs the object signals received by each receiving means separately. Thereby, when the object signals are transmitted from the plurality of predetermined originating communication apparatuses in the same time, the communication apparatus of the ninth aspect can summarize those object signals as one object signal.

This communication apparatus may be used as follows for example. When an object signal is to be transmitted to this communication apparatus, an operator on the other side of the line prepares a plurality of originating communication apparatuses whose identification signals are stored in the communication apparatus of the ninth aspect, divides the object signal to be transmitted into a plurality of signals and transmits each divided signal separately as object signals through each of the originating communication apparatuses. When the respective originating communication apparatuses are operated in parallel, the original object signal is restored because the receiving communication apparatus of the ninth aspect collects the object signals received by the respective receiving means. Accordingly, when an original is transmitted by the above-mentioned procedure, a time required for transmitting the object signal from each originating communication apparatus to the receiving means may be shortened as compared to the case of transmitting the original object signal as it is.

Further, when an object signal is created by reading an original, the originating communication apparatus divides the original into a plurality of parts in advance to transmit the object signal by dividing into a plurality of parts. Then, each originating communication apparatus reads each divided original to create and transmit the object signal. Because a number or an area of the original to be read in each originating communication apparatus is small as compared to a number or an area of the first original at this time, a time required for reading the original in each originating communication apparatus may be shortened as compared to the case of reading and transmitting the original object signal collectively. Accordingly, in the case where the communication apparatus of the ninth aspect is constructed on the basis of the communication apparatus of the second or third aspect, a time from a point of time when the originating communication apparatus starts to read the original until a point of time when the object signal is outputted by the communication apparatus of the ninth aspect, i.e. a time required for the communication between the originating communication apparatus and the inventive communication apparatus, may be shortened.

As described above, according to the ninth aspect, when the identification signals received by the plurality of receiving means coincide with the predetermined plurality of identification signals, the communication apparatus collects the object signals received by those receiving means and outputs as one object signal. Thereby, the time required for reading the original in each originating communication apparatus and the time required for transmitting the object signal from each originating communication apparatus to the receiving means may be shortened. Accordingly a time required for the communication between the originating communication apparatus and the inventive communication apparatus, may be shortened.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
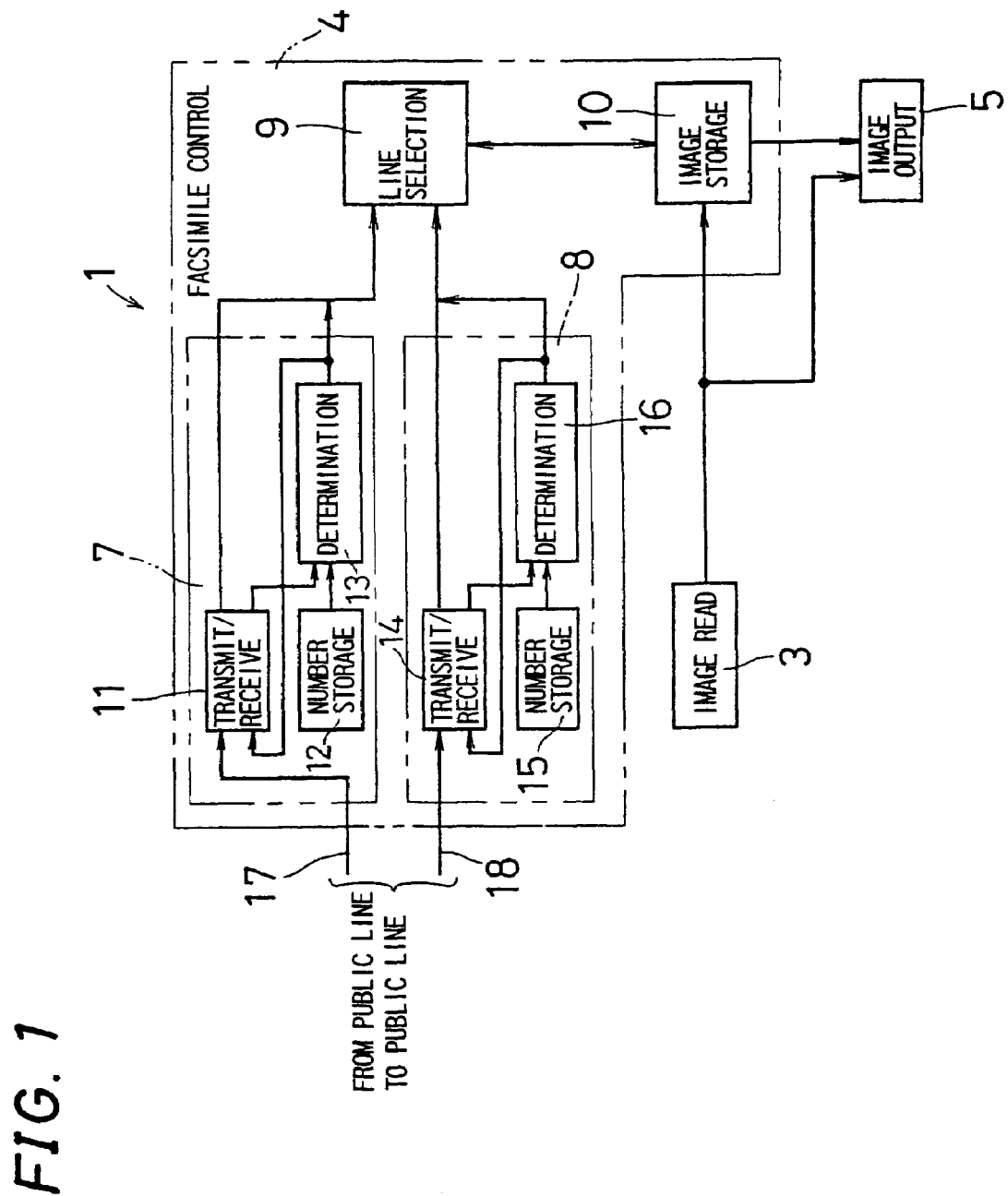
FIG. 1 is a block diagram for explaining a schematic structure of a facsimile machine 1 which is a communication apparatus according to a first embodiment of the present invention.

Now referring to the drawings, preferred embodiments of the invention are described below.

FIG. 1 is a block diagram for explaining a schematic structure of a facsimile machine 1 which is a communication apparatus according to a first embodiment of the present invention. This facsimile machine 1 functions also as a copying machine for reading an original and for printing the result. The facsimile machine 1 comprises an image reading section 3, a facsimile control section 4 and an image output section 5. The facsimile control section 4 contains public lines 17 and 18 and comprises communication control sections 7 and 8, a line selecting section 9 and an image storage section 10. The communication control section 7 comprises a transmitter/receiver section 11, a number storage section 12 and a determination section 13. The communication control section 8 comprises a transmitter/receiver section 14, a number storage section 15 and a determination section 16.

The image reading section 3 reads an original to be read, creates an image data signal representing an image of the original and supplies the image data signal to the image storage section 10 and the image output section 5. The image reading section 3 functions as reading means for reading an original to be transmitted in the facsimile machine 1 and as reading means for reading an original to be copied in the copying machine.

The transmitter/receiver section 11 in the communication control section 7 is connected to the public line 17. The transmitter/receiver section 11 comprises a transmitting and receiving circuits for facsimile communication, establishes a channel between an originating facsimile machine via the public line 17 and performs the facsimile communication based on transmission phases described later. The number storage section 12 stores, in advance, international telephone numbers of the originating facsimile machines which are the predetermined destinations of communication. The international telephone number stored in the number storage section 12 corresponds to an identification signal representing a predetermined originating facsimile machine which is permitted to communicate with the communication control section 7. The determination section 13 extracts the international telephone number from a transmitting subscriber identification signal TSI transmitted in Phase B in the transmission phases described later and determines whether or not that international telephone number coincides with the international telephone number stored in the number storage section 12. Responding to the result of comparison of the determination section 13, the transmitter/receiver section 11 continues the facsimile communication and receives an object signal when the both international telephone numbers coincide. When the both international telephone numbers do not coincide, the transmitter/receiver section 11 ends the facsimile communication without receiving the object signal. The object signal is a signal into which the image data signal is converted corresponding to a transmission system of the facsimile communication.

As compared to the respective sections 11 through 13 of the communication control section 7, the structure and the operation of the respective sections 14 through 16 in the communication control section 8 are the same except of that they are different in that the public line 17 is replaced by the public line 18. Further, the communication control section 8 may be composed of only the transmitter/receiver section 14 so as to perform only the ordinary communication control by eliminating the respective sections 15 and 16. Still more, the respective sections 11 through 16 of the communication control sections 7 and 8 may be imaginary circuits realized by arithmetic operation of arithmetic circuits composing the communication control sections 7 and 8 or be actual circuits.

The line selecting section 9 selects either one of the communication control sections 7 and 8 and connects the selected communication control section with the image storage section 10. Thereby, the object signal received by the selected communication control section is stored in the image storage section 10. Further, it supplies an image data signal output from the image reading section 3 and is stored in the image storage section 10 to the selected communication control section to convert it into an object signal in the transmitter/receiver section of the selected communication control section to transmit from the transmitter/receiver section to a destination facsimile machine.

Furthermore, when the communication control sections 7 and 8 receive object signals in the same time, the line selecting section 9 switches an operation for outputting the object signals received by the transmitter/receiver sections 11 and 14 corresponding to the result of determination performed by the respective determination sections 13 and 16. For instance, when it is determined that international telephone numbers coincide by either one of the determination sections 13 and 16, the line selecting section 9 outputs an object signal received by the transmitter/receiver section of the communication control section including that one determination section prior to an object signal received by the transmitter/receiver section of the communication control section including the other determination section. Further, when the international telephone numbers are determined to coincide by the both of the determination sections 13 and 16, the line selecting section 9 summarizes the object signals received by the transmitter/receiver sections 11 and 14 and outputs a single object signal to store in the image storage section 10. The line selecting section 9 corresponds to an output means which relates to output of the object signal.

The image output section 5 obtains the object signal stored in the image storage section 10 and develops the object signal as an image. Or, it obtains the image data signal created by the image reading section 3. The image output section 5 prints images represented by those image data signals on a recording sheet, or displays their images on a display. The image output section 5 functions as a means for printing or displaying the received image data signals in the facsimile machine, and as a means for printing and displaying the read images in the copying machine.

Figure 2:
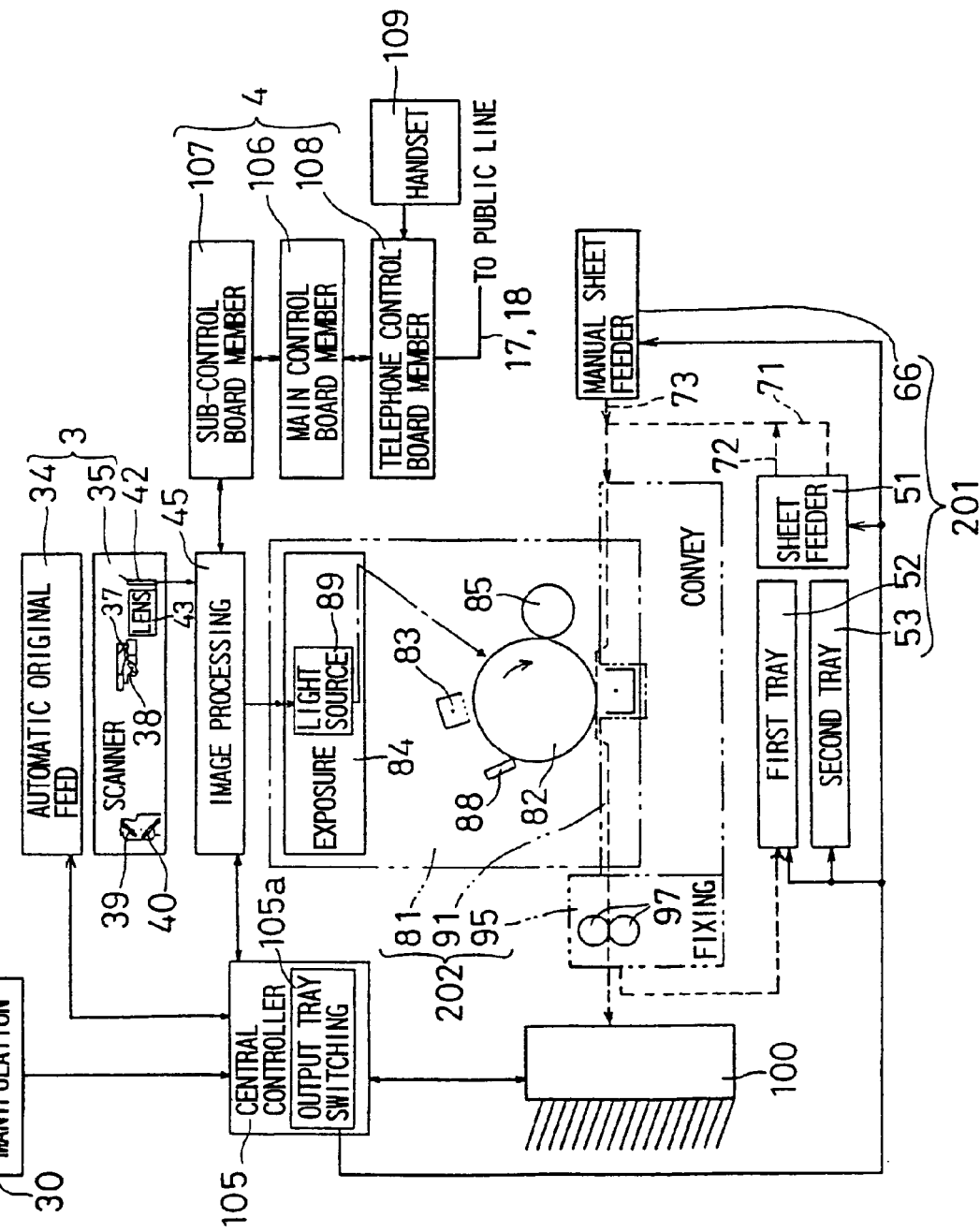
FIG. 2 is a block diagram showing an electrical and mechanical structure of the facsimile machine 1.
Figure 3:
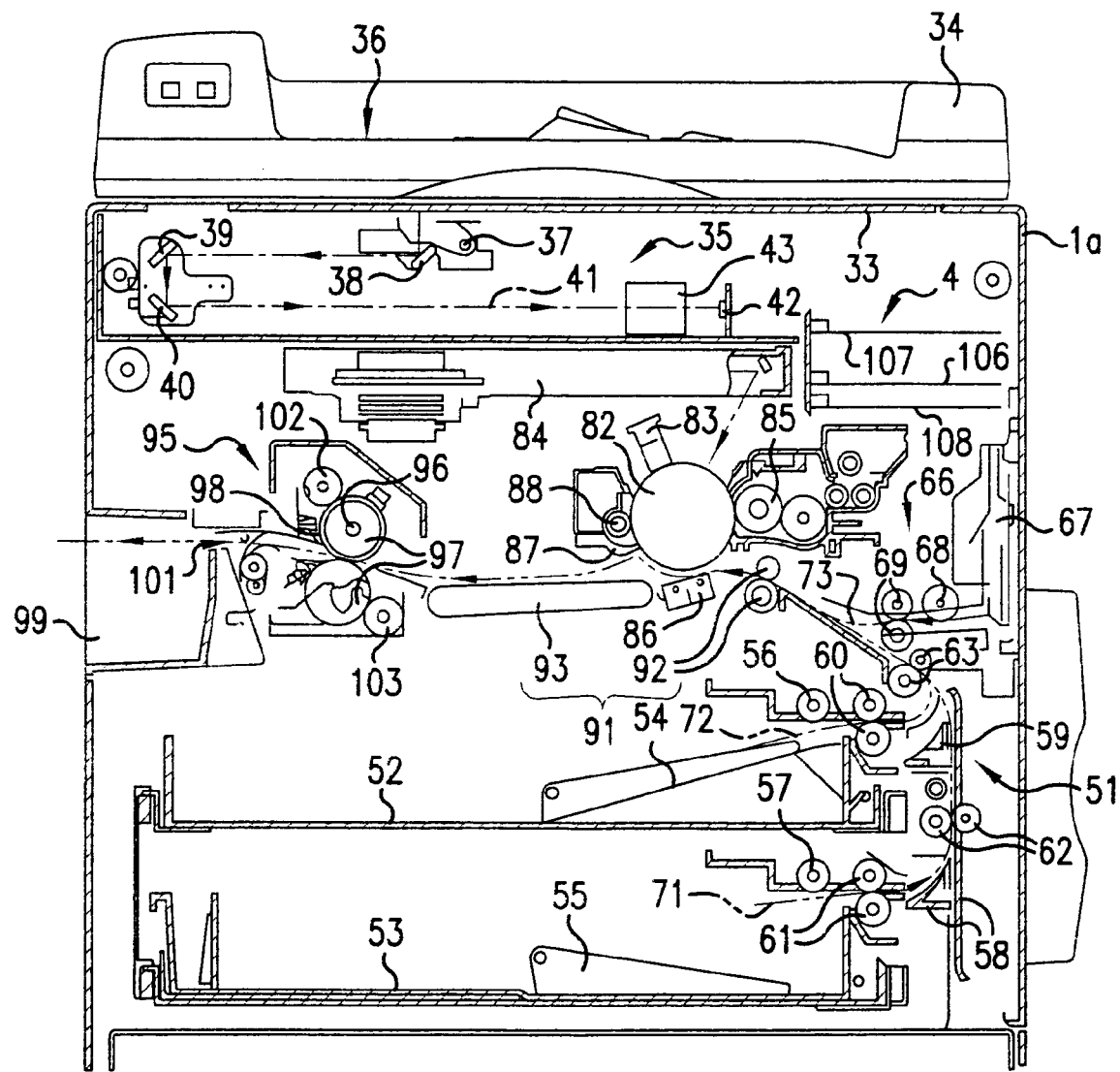
FIG. 3 is a section view showing a concrete mechanical structure of the facsimile machine 1.

FIG. 2 is a block diagram showing a basic electrical and mechanical structure of the facsimile machine 1 and FIG. 3 is a section view showing a concrete mechanical structure of the facsimile machine 1. FIGS. 2 and 3 will be explained together. In FIG. 2, arrows of solid lines denote flows of signals, arrows of broken lines denote flows of a recording sheet and an arrow of alternate chain line denotes a light beam. Beside the image reading section 3, the facsimile control section 4 and the image output section 5, the facsimile machine 1 comprises a manipulator section 30, a central control section 105 and a handset 109.

The manipulator section 30 is provided for enabling an operator of the facsimile machine 1 to manipulate the facsimile machine 1 and comprises the display, key switches and an alarm lamp for example. Information necessary for the manipulation is displayed on the display. The operator decides contents of manipulation by referring to the information displayed on the display and manipulates the key switches accordingly. The result of manipulation of the key switches is supplied to each section of the facsimile machine 1 as the result of manipulation from the manipulator section 30. The alarm lamp lights in a predetermined mode corresponding to an operating state of the facsimile machine 1 in informing of it to the operator.

The image reading section 3 comprises an original platen 33 which is a transparent plate, an automatic original feeder 34 accommodating to both sides of the original and a scanner section 35.

The platen 33 is fitted in the upper part of a casing 1a of the facsimile machine 1. Accordingly, the inside of the case 1a is visible from the outside through the platen 33. The automatic original feeder 34 accommodating to the both sides is disposed above the platen 33. The automatic original feeder 34 is arranged such that a plurality of originals are stored in an original storage section 36 in advance and the original is fed to the platen 33 one by one such that the one side or the both sides of the original face to the surface of the platen 33 by using a feeding method specified by the operator. When the specified feeding method is what reads only one side of the original, the original is fed to the platen 33 only one time. When the method is what reads the both sides of the original, the face of the original is inverted and is fed again to the platen 33 after feeding to the platen 33 once.

The scanner section 35 comprises a light emitting source 37, reflecting mirrors 38 through 40, an image pickup device 42 and an image forming lens 43. The light emitting source 37 may be realized by a lamp reflector assembly for example and emits a laser beam toward the original placed on the platen 33 to expose it. This laser beam passes through the platen 33 and hits the surface of the original. It is then reflected on the surface of the original with reflectance corresponding to light and darkness of the image of the original. The light reflected from the original is reflected sequentially by reflecting mirrors 38 through 40 to bend its optical path. Thereby, the reflected light image formed by the light reflected from the original follows the optical path represented by a broken line 41 and is led to an image forming plane of the image pickup device 42 comprising a plurality of photoelectric converting elements. The image forming lens 43 is disposed on the optical path between the reflecting mirror 40 and the image pickup device 42 to form a reflected light image on the image forming plane of the image pickup device 42.

The plurality of photoelectric converting elements are arranged on the image forming plane of the image pickup device 42. Each photoelectric converting element corresponds to each picture element of the image obtained by the image pickup device. The image pickup device 42 receives the reflected light image formed on the image forming plane divisionally by each photoelectric converting element. Each photoelectric converting element outputs image data indicative of density of the corresponding picture element in correspondence to a quantity of reflected light received by the photoelectric converting element. This image data is an analog electrical signal which increases/decreases in proportion to the quantity of received reflected light in this stage. A set of the image data from all of the photoelectric converting elements is output from the image pickup device as an analog image signal representing the image. This analog image signal is supplied to an image processing section 45.

The image processing section 45 converts the analog image signal into an image data signal which is a digital signal and stores it. This image data signal is supplied to and stored in the image storage section 10 in the facsimile control section 4. Further, it generates a printing data signal which represents an image containing the original image and to be printed on a recording sheet from the image data signal and gives it to the image output section 5. A detailed structure and operation of the image processing section 45 will be explained later.

The image output section 5 comprises a sheet feeder section 51, first and second trays 52 and 53, a manual sheet feeder section 66, an image forming section 81, a conveying section 91, a fixing section 95 and a sorter 100. The sheet feeder section 51 is provided in connection with the first and second trays 52 and 53 for storing the recording sheets. The sheet feeder section 51, the first and second trays 52 and 53 and the manual sheet feeder section 66 compose a supplying section 201. The image forming section 81, the conveying section 91 and the fixing section 95 compose a printing section 202.

The first and second trays 52 and 53 include stacking members 54 and 55, respectively. The stacking members 54 and 55 are provided on the first and second trays 52 and 53 in the perpendicular direction and are attached to the first and second trays 52 and 53 such that the edge thereof on the sheet feeder section 51 side can be freely angularly displaced in the direction separating/approaching from/to the bottom face of the first and second trays 52 and 53. The recording sheets are stacked on the first and second trays 52 and 53 such that the edge thereof is placed on the stacking members 54 and 55. An output tray switching section 105a within the central control section 105 controls that to which direction among the direction separating/approaching from/to the bottom face the stacking members 54 and 55 should be angularly displaced.

The sheet feeder section 51 comprises fetch rollers 56 and 57, first and second guide members 58 and 59, respective pairs of feed rollers 60 and 61 and respective pairs of conveying rollers 62 and 63. The fetch roller 56 and 57 are provided at the positions closed to the edges of the stacking members 54 and 55 when the edges are angularly displaced in the direction separating from the bottom of the trays. The first guide member 58 is provided almost vertically to the bottom of the facsimile machine 1 on the side of the edge of the first and second trays 52 and 53 and is curved such that the lower edge thereof approaches to the second tray 52. The second guide member 59 is provided on the side of the edge of the first tray 52 and is curved such that the lower edge thereof approaches to the first tray 52. The feed rollers 60 and 61 are disposed between the fetch rollers 56 and 57 and the respective guide members 59 and 58. The conveying rollers 62 are disposed above the feed roller 61 within the first guide member 58. The conveying rollers 63 are disposed near the upper edge of the first and second guide members 58 and 59. An operation of each roller of the sheet feeder section 51 is controlled by the output tray switching section 105a.

The manual feeder section 66 comprises a stacker 67 for stacking recording sheets, a fetch roller 68 and a pair of feed rollers 69. The stacker 67 is provided at an opening of the casing 1a of the facsimile machine 1 and allows recording sheets to be stacked from the outside. The stacker 67 may be stored within the casing 1a such that the bottom thereof becomes parallel to the side of the casing 1a and FIG. 3 shows the state in which it is thus stored. The fetch roller 68 is provided near an opening of the stacker 67. The feed rollers 69 are provided inside of the casing 1a more than the fetch roller 68. The output tray switching section 105a controls also an operation of each roller of the manual feeder section 66.

When a recording sheet is to be supplied from the second tray 53, the output tray switching section 105a displaces the stacking member 55 angularly in the direction separating from the bottom at first. When the fetch roller 57 is rotated in this state, the recording sheet stacked at the top among the recording sheets stacked in the second tray 53 is conveyed such that the edge thereof abuts between the pair of feed rollers 61. When the pair of feed rollers 61 rotate in this state, the recording sheet passes between the pair of feed rollers 61 and is conveyed such that the edge thereof abuts with the first guide member 58. After abutting its edge, the recording sheet is conveyed upward in the perpendicular direction along the first guide member 58. The recording sheet passes between the pair of conveying rollers 62 on the way and is conveyed upward as the conveying rollers 62 rotate at this time. This recording sheet also passes between the pair of conveying rollers 63 and is conveyed to the image forming section 81 as the conveying rollers 63 rotate at this time. The recording sheet is conveyed thus from the second tray 53 to the image forming section 81 by passing through the conveying path indicated by a curve 71 through this series of operations.

When a recording sheet is to be supplied from the first tray 52, the output tray switching section 105a displaces the stacking member 54 angularly in the direction separating from the bottom at first. When the fetch roller 56 rotates in this state, the recording sheet stacked at the top among the recording sheets stacked in the first tray 52 is conveyed such that the edge thereof abuts between the pair of feed rollers 60. When the pair of feed rollers 60 rotate in this state, the recording sheet passes between the pair of feed rollers 60 and is conveyed such that the edge thereof abuts with the second guide member 59. After abutting its edge, the recording sheet is conveyed along the second and first guide members 59 and 58 and passes between the pair of conveying rollers 63. This recording sheet is conveyed to the image forming section 81 as the conveying rollers 63 rotate at this time. The recording sheet is thus conveyed from the first tray 52 to the image forming section 81 by passing through the conveying path indicated by a curve 72 and by joining with the conveying path indicated by the curve 71 on the way through this series of operations.

When a recording sheet is to be supplied from the manual feeder section 66, the stacker 67 is set such that its bottom becomes almost horizontal and recording sheets are stacked on that. When the output tray switching section 105a rotates the fetch roller 68 in this state, the recording sheet stacked at the top among the recording sheets stacked on the stacker 67 is conveyed such that its edge abuts between the pair of feed rollers 69. When the pair of feed rollers 69 rotate in this state, the recording sheet is conveyed to the image forming section 81 by passing between the pair of feed rollers 69. The recording sheet is then conveyed from the stacker 67 to the image forming section 81 by passing through the conveying path indicated by a curve 73 and by joining with the conveying path indicated by the curve 71 on the way through the series of operations. Thereby, the recording sheet is conveyed from the stacker 67 to the image forming section 81.

The image forming section 81 comprises a photoreceptor 82, a charging section 83, an exposing section 84, a developing section 85, a transfer section 86, a discharging section 87 and a cleaning section 88. The conveying section 91 comprises a pair of resist rollers 92 and a suction 93. The image forming section 81 prints an image on a recording sheet by means of so-called xerography or of PPC (Plain Paper Copier) system. The conveying section 91 conveys the recording sheet fed from the sheet feeder section 51 or the manual feeder section 66 to the image forming section 81 and conveys the recording sheet on which an image has been printed from the image forming section 81 to the fixing section 95.

The cylindrical photoreceptor 82 rotates in the sub-scan direction parallel to the circumferential direction centering on the center of the bottom face thereof as an axis of rotation. The charging section 83, the exposing section 84, the developing section 85, the transfer section 86, the discharging section 87 and the cleaning section 88 are disposed in this order in the sub-scan direction along the circumference of the photoreceptor 82. A laser beam emitted from the exposing section 83 is irradiated to the surface of the photoreceptor 82 by passing between the charging section 83 and the developing section 85. In the PPC system, images may be printed on the recording sheets repeatedly by repeating six steps including five basic steps of a charging step, an exposing step, a developing step, a transfer step and a discharging step and a cleaning step for repeatedly using the photoreceptor 82.

In concrete, when an image is to be printed by the image forming section 81, the surface of the photoreceptor 82 is charged uniformly by the charging section 83. The exposing section 84 is controlled by a sequence controller therein so as to control the emission and stop of a laser beam from a light source 89 corresponding to bits of the printing data signal which is a binary signal given from the image processing section 45. The exposing section 84 emits the laser beam from the light source 89 by deflecting it by changing an angle of deflection thereof along an elapse of time to scan the charged surface of the photoreceptor 82 in the main scan direction parallel to the axis of rotation of the drum. Thereby, an electrostatic latent image is formed on the surface of the photoreceptor 82. The developing section 85 develops the electrostatic latent image by adhering toner stored therein on the surface of the photoreceptor 82. Thereby, the electrostatic latent image is developed as a toner image.

A pair of resist rollers 92 cause the recording sheet supplied from the feeder section 51 or the manual feeder section 66 to pass between the rollers to convey between the photoreceptor 82 and the transfer section 86. The transfer section 86 transfers the toner image on the surface of the photoreceptor 82 to the conveyed recording sheet. The recording sheet on which the image has been transferred is conveyed to the fixing section 95 by the suction 93. The suction is what conveys an object to be conveyed stacked on a belt-like member as it is by moving the belt-like member whose both ends are connected and having rollers inside thereof by rotating the rollers and by adsorbing the object to the belt-like member by means of air flow. The discharging section 87 removes charges on the surface of the photoreceptor 82 after the transfer and the cleaning section 88 cleans the photoreceptor 82 by removing the toner left on the surface thereof. After the cleaning, the photoreceptor 82 returns to the state in which the series of steps from the charging step to the cleaning step may be performed again.

The fixing section 95 comprises a heating source 96, a pair of heating rollers 97, a peeling claw 98 and cleaning rollers 102 and 103. The heating source 96 is provided within one roller of the pair of heating rollers 97 to heat the heating roller 97 to a predetermined temperature. The recording sheet conveyed by the conveying section 91 passes between the pair of heating rollers 97. At this time, the toner on the recording sheet is fused by the heat of the heating roller 97 and after passing through the heating rollers 97, the toner is cooled and is fixed to the recording sheet. The toner image thus is fixed on the recording sheet.

After the heating, the recording sheet is peeled off the heating roller 97 by the peeling claw 98 and is discharged to the outside of the casing 1a from a discharge port 99 of the casing 1a. When a sorter 100 is attached at the discharge port 99, the recording sheet is discharged so as to be stored in each tray of the sorter 100 by a discharging and separating member 101. When it has been specified to print on the both sides from the manipulator section 30, the recording sheet is not discharged to the discharge port or to the sorter 100 on the stage when the printing on one side of the recording sheet is finished and is returned to the first tray 52. Returning this recording sheet, the first tray 52 stacks it on the top of the stacked recording sheets. The cleaning rollers 102 and 103 remove the toner adhered on the pair of heating rollers 97 after peeling off the recording sheet.

The central control section 105 controls the behaviors of the manipulator section 30, the image reading section 3, the image processing section 45 and the sorter 100 to synchronize their operations. Due to that, the central control section 105 performs serial communication between the respective sections 30, 3 and 45 and between the sorter 100.

Various circuit parts composing the facsimile control section 4 are mounted by dividing into three boards of a main control board member 106, a sub-control board member 107 and a telephone control board member 108. The main control board member 106 contains circuit parts for controlling the lines for the facsimile communication and various functions of the facsimile. The sub-control board member 107 contains circuits parts which operate as an interface of the image data signal between the image output section 5 and the main control board member 106. The sub-control board member 107 also contains circuit parts for generating an image data signal by developing an object signal as an image in order to use the image output section 5 as printing means of the facsimile machine. The telephone control board member 108 contains circuit parts for physically connecting the public lines 17 and 18 with the facsimile control section 4 and for performing the basic telephone control. Further, in connection with the telephone control board member 108, a handset 109 is provided. When the handset 109 is used, the telephone control board member 108 establishes a channel between a destination telephone and transmits/receives speech signals via the public lines 17 and 18.

Figure 4:
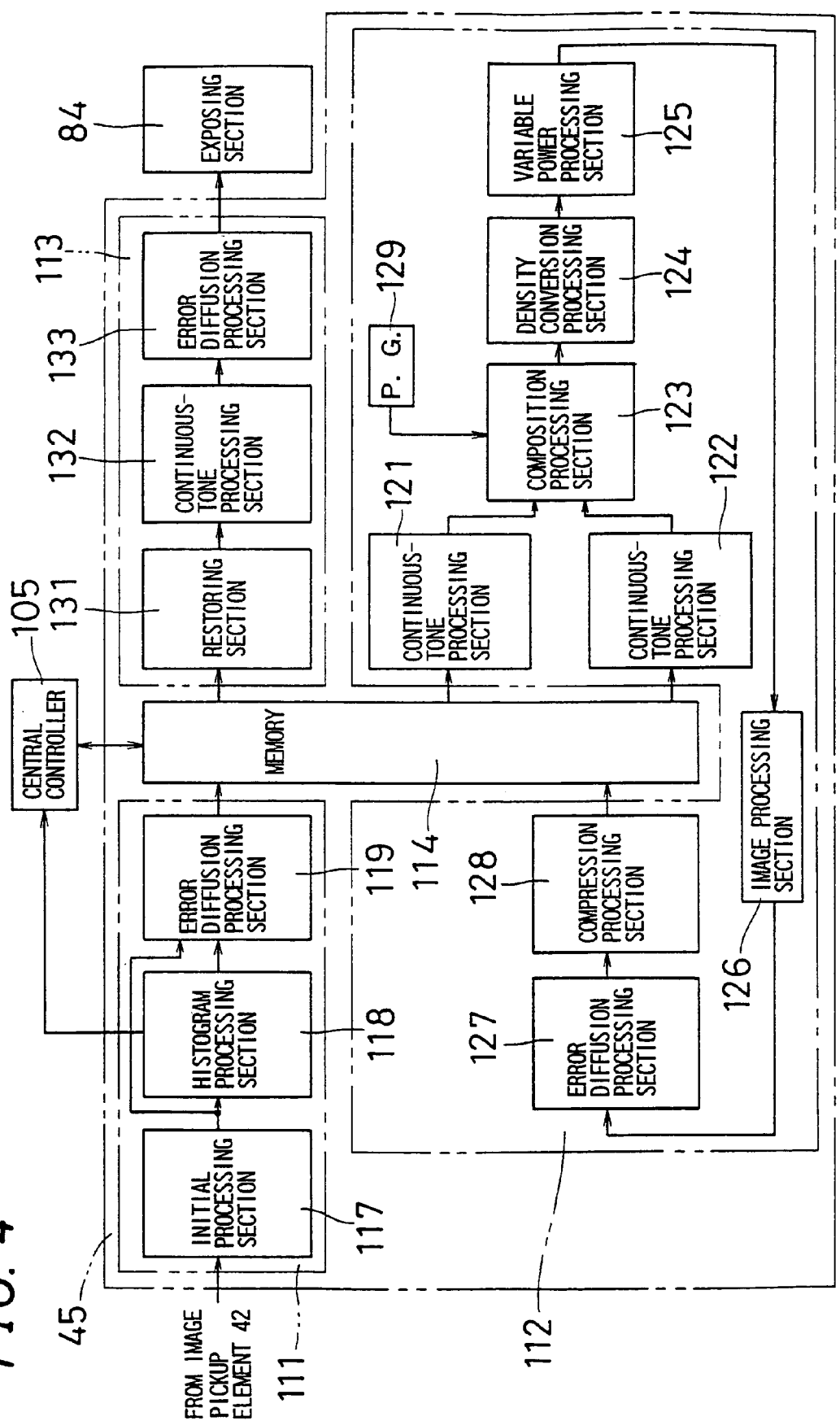
FIG. 4 is a block diagram showing a concrete electrical structure of an image processing section 45.

FIG. 4 is a block diagram showing a concrete electrical structure of the image processing section 45. The image processing section 45 comprises, in summary, a signal input section 111, a signal processing section 112, a signal output section 113 and a memory 114. This memory 114 may function also as the image storage section 10 described before or may be separately provided.

The signal input section 111 comprises an initial processing section 117, a histogram processing section 118 and an error diffusion processing section 119. In short, the signal input section 111 converts the analog image signal output from the image pickup device 42 into a digital signal, binarizes it by error diffusion while taking a histogram indicative of information on its density and stores it once in the memory 114.

In concrete, the analog image signal from the image pickup device 42 is given to the initial processing section 117. The initial processing section 117 converts pixel data of each picture element composing the analog image signal from analog to digital and performs MTF correction, white and black correction and gamma correction. Thereby, each pixel data is output to the histogram processing section 118 as a digital signal of 256 gradations, i.e. a 8 bit signal. The histogram processing section 118 adds the pixel data output from the initial processing section 117 per density of pixel of the 256 gradations. Thereby, histogram data which is information on density of the image is obtained. This histogram data is given to the central control section 105 and the error diffusion processing section 119.

The error diffusion processing section 119 binarizes the pixel data output from the initial processing section 117 by using the error diffusion which is one type of pseudo half-tone process. The error diffusion is a method of reflecting an error caused by the binarization in determinating the binary of the pixel adjoining the pixel to be processed. In concrete, the error diffusion processing section 119 binarizes the pixel data which is the 8 bit digital signal output from the initial processing section 117 to convert into one bit digital signal and performs re-allocating operation for faithfully reproducing density of a local area within an original in printing its image. Each pixel data processed by the error diffusion processing section 119 is collected similarly to the original image signal and is stored in the memory 114 as the image data signal.

The signal processing section 112 comprises continuous-tone processing sections 121 and 122, a composition processing section 123, a density conversion processing section 124, a variable power processing section 125, an image processing section 126 an error diffusion processing section 127, a compression processing section 128 and a pattern generator 129. In short, the signal processing section 112 converts the image data signal stored in the memory 114 into a printing data signal which represents an image desired by the operator of the facsimile machine 1 and stores it again in the memory 114. However, each of the processing sections 121 through 128 contained in the signal processing section 112 functions as necessary and may be stopped when specified from the manipulator section 30 for example. In this case, that processing section outputs an input signal as it is.

In concrete, the continuous-tone processing sections 121 and 122 read each pixel data binarized by the error diffusion processing section 119 from the memory 114 and convert it into pixel data indicative of the 256 gradations again. The composition processing section 123 performs logical operation selectively per each pixel data in order to composite the pixel data output from the continuous-tone processing sections 121 and 122 and bit data output from the pattern generator 129. The logical operation includes operations of a logical sum, a logical product and an exclusive logical sum.

A gradation conversion table indicative of a relationship of density of pixel of an output image to density of pixel of an original is stored in the density conversion processing section 124 in order to correct the density of each pixel of the image. Based on the gradation conversion table, the density conversion processing section 124 corrects the pixel data output from the composition processing section 123. The variable power processing section 125 enlarges or reduces the image represented by the image data signal which is a set of the pixel data output from the density conversion processing section 124 in correspondence to a scale factor specified from the manipulator section 30. In concrete, it finds pixel data representing the density of each pixel of the enlarged or reduced image by performing interpolation using the pixel data output from the density converting processing section 124. This process is performed on the pixels arrayed in the direction corresponding to the main scan direction of the photoreceptor 82 after performing on the pixels arrayed in the direction corresponding to the sub-scan direction of the photoreceptor 82 in the enlarged or reduced image for example.

The image processing section 126 performs various image processings to the image data signal output from the variable power processing section 125. It also collects information on the data string such as feature extraction from this image data signal. The error diffusion processing section 127 binarizes the image data signal output from the image processing section 126 by the same process with that of the error diffusion processing section 119 of the signal input section 111 to create a printing data signal. The compression processing section 128 compresses the printing data signal by run-length coding for example. Further, when the processes from the continuous-tone processing sections 121 and 122 to the error diffusion processing section 127 are repeated by several times, the compression processing section 128 operates at the point of time when the image data signal to be output from the image processing section 45 is created finally as the printing data signal and stops in another time. The printing data signal after the compression is stored in the memory 114.

The signal output section 113 comprises a restoring section 131, a continuous-tone processing section 132 and an error diffusion processing section 133. In short, the signal output section 113 restores the printing data signal stored in the memory 114 in the compressed state, converts again into the signal of the original 256 gradations to perform error diffusion of four-value data and gives that data to the exposing section 84. In concrete, the restoring section 131 restores the printing data signal by reading and expanding the compressed printing data signal from the memory 114. The continuous-tone processing section 132 multi-values each pixel data of the printing data signal output from the restoring section 131 by the same process with that of the continuous-tone processing sections 121 and 122 of the signal processing section 112. The error diffusion processing section 133 quadruples the pixel data output from the continuous-tone processing section 132 by using the error diffusion of four-valued data. The error diffusion of four-valued data is similar to the error diffusion of binary data performed in the error diffusion processing section 119 of the signal input section 111 and allows the half-tone to be represented smoothly more than the pixel data processed by the error diffusion of binary data.

The printing data signal composed of those pixel data is given to the exposing section 84 of the image forming section 81. The exposing section 84 converts each pixel data of this printing data signal into a signal for oscillating/stopping the laser light emitted from the light source 89 and gives it to the light source 89. Thereby, the light source 89 oscillates/stops the laser light corresponding to the value of the pixel data of the printing data signal.

It is noted that the image data signal and the printing data signal are stored in the memory 114 basically in a form of binarized digital data in order to reduce a capacity of the memory 114 and are handled by the signal input section 111, the signal processing section 112 and the signal output section 113 in this form. These data signals may be stored and handled in a form of four-valued digital data in consideration of deterioration of the data signal. Further, the object signal may be created from the printing data signal by giving the printing data signal to the facsimile control section 4, instead of the image data signal.

Figure 5:
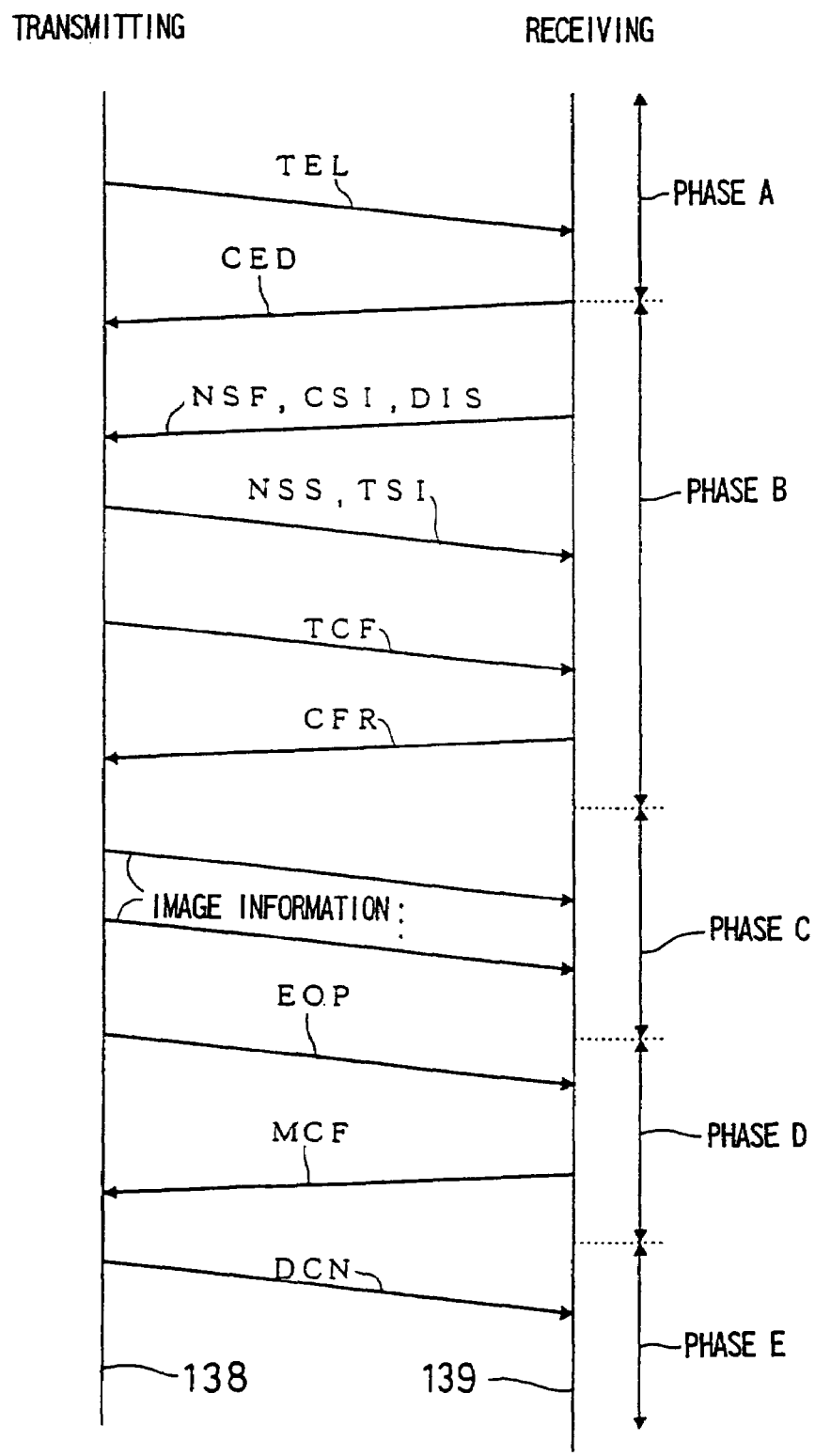
FIG. 5 is a chart for explaining fundamental transmission phases of the facsimile machine 1.

FIG. 5 is a control flowchart for explaining the fundamental transmission phases of facsimile communication. In FIG. 5, line segments 138 and 139 represent transmitting and receiving facsimile machines, respectively, and arrows between those line segments 138 and 139 represent signals transmitted/received between the both facsimile machines. Although those signals might be processed by various apparatuses within the public lines, e.g. an exchange through which the signal is transmitted/received, an explanation thereof will be omitted here. Further, an axis of time is set in parallel to the line segments 138 and 139 and the signal transmitting/receiving timing represented by the arrows of the lower arrow is late as compared to that of the upper arrow in the figure. This transmission phase is a so-called binary coding transmission phase. The transmission phase of the facsimile communication is divided into Phases A through E.

Phase A is a step for setting a call and establishing channel. In a state in which the transmitting facsimile machine and the receiving facsimile machine are connected to a public line, the transmitting facsimile machine gives a calling tone TEL which is a tone signal of 1100 Hz to the receiving facsimile machine at first. Responding to the calling tone TEL, the receiving facsimile machine gives a called station identification signal CED which is a tone signal of 2100 Hz to the transmitting facsimile machine. Phase A ends here. Thereby, the channel is established between the both facsimile machines. After ending Phase A, the phase advances to Phase B.

Phase B is a pre-processing step for transmitting an object signal. At first, the receiving facsimile machine gives a digital identification signal DIS, a called subscriber identification signal CSI and a non-standard facilities identification signal NSF to the transmitting facsimile machine. Responding to those signals DIS, CSI and NSF, the transmitting facsimile machine outputs a non-standard facilities set-up signal NSS, a transmitting subscriber identification signal TSI and a training check TCF sequentially to the receiving facsimile machine. Responding to those signals NSS, TSI and TCF, the receiving facsimile machine transmits a confirmation-to-receive signal CFR to the transmitting facsimile machine. Thus, Phase B ends. After Phase B, the phase advances to Phase C. When a trouble related to the transmission/receiving of the object signal occurs in the transmitting or receiving facsimile machine during Phase B, the receiving facsimile machine outputs a control signal instructing to stop the transmission/receiving of the object signal, instead of the confirmation-to-receive signal CFR. Then, the phase shifts from phase B to phase E.

The digital identification signal DIS indicates that the receiving facsimile machine has the CCITT standard receiving function. The called subscriber identification signal CSI represents the receiving facsimile machine by an international telephone number. The non-standard facilities identification signal NSF shows facilities which can be implemented in the receiving facsimile machine among the non-standard facilities out of the scope of the T series recommendation. The non-standard facilities set-up signal NSS shows a facility selected by the transmitting facsimile machine among the non-standard facilities showed by the non-standard facilities identification signal NSF and is a command signal for setting the implementation of the facility. The transmitting subscriber identification signal TSI represents the transmitting facsimile machine by an international telephone number. The training check TCF is a signal for confirming training of a modem provided in the receiving facsimile machine and for confirming whether or not the channel can be used with a transmission rate of the signal transmitted during the training check. The confirmation-to-receive signal CFR is a response signal indicating that the receiving facsimile machine is ready to receive the object signal and that the transmitting facsimile machine may start to transmit the object signal.

Phase C is a step for transmitting the object signal. After receiving the confirmation-to-receive signal CFR, the transmitting facsimile machine gives the object signal representing an image to be transmitted to the receiving facsimile machine. The object signal is created per page of the image, i.e. per one original read by the image reading section 3, and when there are plural number of originals, the same number of object signals are prepared. Every time when the object signal representing the image in each page is transmitted, a control signal indicative of that is transmitted. In parallel to the transmission of the object signal, control signals for controlling processes such as confirmation of the transmission and maintenance of the synchronization are transmitted/received between the both facsimile machines. When all of the object signals are transmitted, Phase C ends. After the end of Phase C, the phase advances to Phase D.

Phase D is a post-processing step for transmitting the object signal. After ending to transmit the object signal, the transmitting facsimile machine gives an end-of-procedures signal EOP to the receiving facsimile machine. Responding to this signal, the receiving facsimile machine gives a message confirmation signal MCF to the transmitting facsimile machine. Thus, Phase D ends. After ending Phase D, the phase shifts to Phase E. The end-of-procedures signal EOP indicates an end of page of the object signal that there is no object signal which has not been transmitted yet among the prepared object signals. The message confirmation signal MCF is an acknowledgment to the end-of-procedure signal EOP and indicates that the object signals have been received without error.

Phase E is a step for canceling the call or for disconnecting the channel. After receiving the message confirmation signal MCF or after receiving the control signal instructing to stop the communication output in Phase B, the transmitting facsimile machine gives a Disconnect signal DCN to the receiving facsimile machine to disconnect the channel between the transmitting facsimile machine and the public line. Responding to the disconnect signal DCN, the receiving facsimile machine disconnects the channel between the public line and the receiving facsimile machine. Thus, Phase E ends. The disconnect signal DCN is a control signal for instructing the receiving facsimile machine to start Phase E. Thus, the facsimile communication is performed based on the series of processing procedures from Phase A to Phase E.

Figure 6:
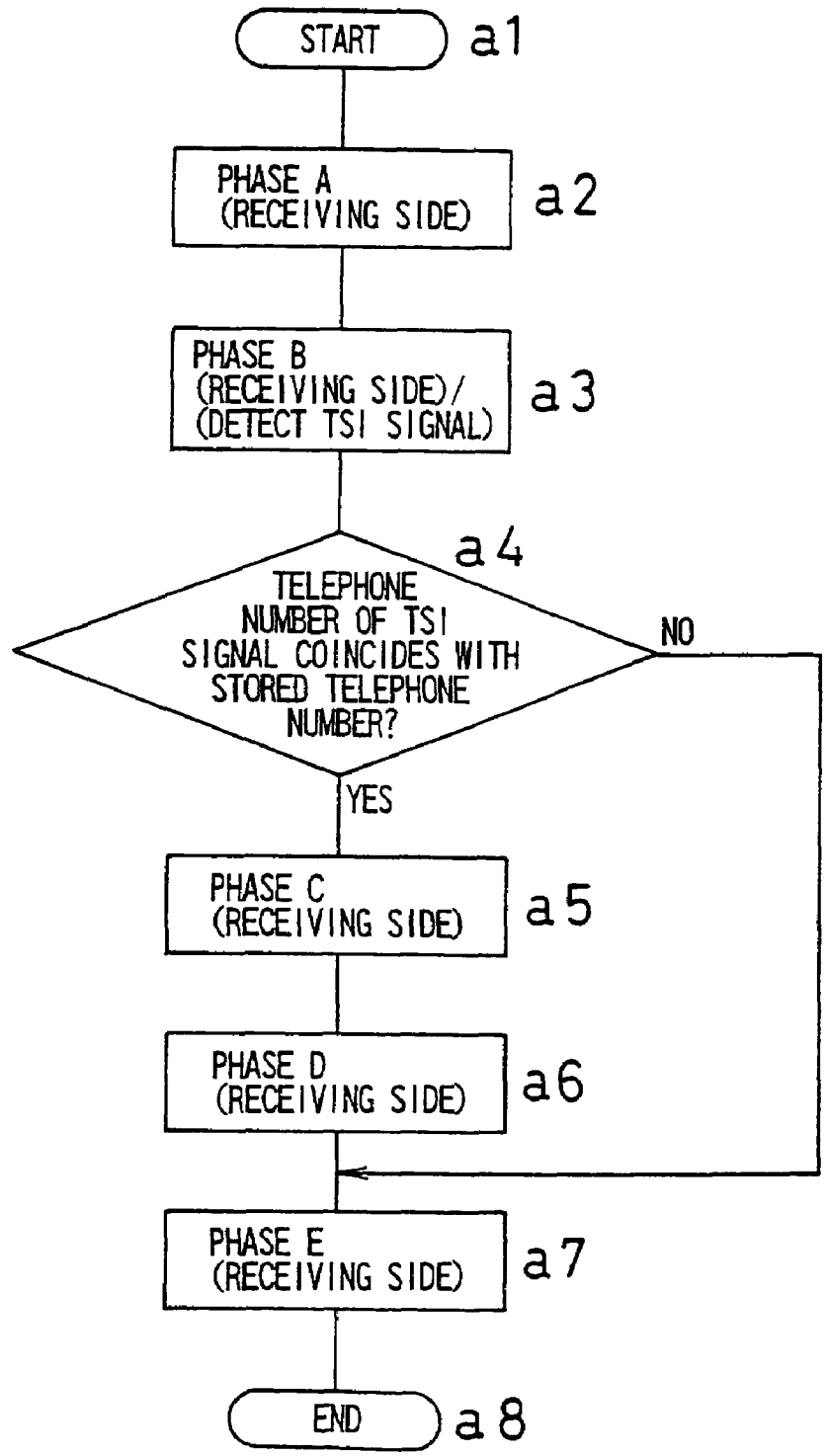
FIG. 6 is a flowchart for explaining a receiving operation of the facsimile machine 1.

FIG. 6 is a flowchart for explaining a receiving operation of the facsimile machine 1 performed in the communication control section 7. The communication control section 7 waits in a standby state in which it can receive various signals from originating facsimile machines. When the calling tone TEL is given in this state, the process advances from Step a1 to Step a2. In Step a2, the transmitter/receiver section 11 sets the call and establishes the channel by transmitting/receiving the signals in accordance to the processing procedure of the receiving side in Phase A described above. Next, the transmitter/receiver section 11 performs the preprocessing by transmitting/receiving the signals in accordance to the processing procedure of the receiving side in Phase B described above in Step a3. During the pre-processing, the transmitting subscriber identification signal TSI is given from the originating facsimile machine to the facsimile machine 1.

Then, the determination section 13 extracts an international telephone number of the originating communication apparatus from the transmitting subscriber identification signal TSI in Step a4. Next, the determination section 13 reads the predetermined international telephone number from the number storage section 12 to determine whether or not the read international telephone number coincides with the extracted international telephone number. When it is determined that the both international telephone numbers coincide, the process advances from Step a4 to Step a5. That is, the transmitter/receiver section 11 receives the object signal by transmitting/receiving the signals in accordance to the processing procedures of the receiving side in Phase C described above. Further, after ending to receive the object signal, the transmitter/receiver section 11 performs the post-processing by transmitting/receiving the signals in accordance to the processing procedures of the receiving side in Phase D described above in Step a6. After ending the post-processing, the transmitter/receiver section 11 disconnects the channel by transmitting/receiving the signals in accordance to the processing procedures of the receiving side in Phase E described above in Step a7. Then, the process ends in Step a8. When it is determined that the read international telephone number does not coincide with the extracted international telephone number in Step a4, the process advances directly from Step a4 to Step a7 to disconnect the channel by transmitting/receiving the signals in accordance to the processing procedures of the receiving side in Phase E described above without receiving the object signal by the transmitter/receiver section 11. Then, the process ends in Step a8.

Thereby, the transmitter/receiver section 11 receives only the object signal from the originating facsimile machine identified by the international telephone number stored in the number storage section 12 and does not receive any object signal from the other facsimile communication. That is, the transmitter/receiver section 11 automatically rejects to receive any object signal from an unspecified number of facsimile machines except of the predetermined originating facsimile machine whose international telephone numbers is stored in the number storage section 12. Thereby, the transmitter/receiver section 11 and the public line 17 operate as dedicated receiving means for receiving the object signal from the predetermined originating facsimile machine. Accordingly, when the predetermined originating facsimile machine transmits the object signal to the facsimile machine 1, the facsimile machine 1 receives the signal from the originating facsimile machine instantly because the transmitter/receiver section 11 is always opened.

Therefore, when the object signal is to be transmitted from the originating facsimile machine to the facsimile machine 1, a transmission waiting time from when the originating facsimile machine starts the transmitting operation until when the channel is actually connected between the originating facsimile machine and the facsimile machine 1, thus enabling the transmission, may be shortened as compared to that of the prior art facsimile machines. The communication control section 8 can also shorten the transmission waiting time similarly to the communication control section 7 by performing the receiving operation by using the procedure explained in the flowchart in FIG. 6. The above-mentioned receiving operation may be performed also in a case when only one public line is stored in the facsimile machine 1.

It is also possible to arrange such that the communication control section 8 receives the object signal regardless of the identification signal by composing the communication control section 7 so as to include the respective sections 11 through 13 as described above and by composing the communication control section 8 so as to include only the transmitter/receiver section 14 by eliminating the sections 15 and 16. In this case, the facsimile machine 1 can transmit/receive object signals between the unspecified number of originating facsimile machines by using the transmitter/receiver section 14 of the communication control section 8 and the public line 18. Accordingly, the communication control section 7 can be used as a communication control section dedicated for receiving the object signal from the specified originating facsimile machine and the communication control section 8 as a general purpose communication control section in the facsimile machine 1.

Thus, the facsimile machine 1 can receive object signals from the predetermined originating facsimile machine instantly at any time, because the communication control section 7 is opened even when it transmits/receives object signals between the unspecified number of originating facsimile machines by using the communication control section 8. Accordingly, this facsimile machine can transmit/receive object signals arbitrarily between the unspecified number of facsimile machines and can shorten the transmission waiting time of the predetermined originating facsimile machine. Thereby, the usability of the facsimile machine may be improved further. Moreover, because the above-mentioned two operations may be realized by one facsimile machine, it becomes unnecessary to provide one facsimile machine dedicated for receiving and a facsimile machine dedicated for transmission/receiving separately.

Further, when the communication control sections 7 and 8 receive object signals at the same time, the line selecting section 9 sends the object signal from the predetermined originating facsimile machine to the image output section 5 with priority to print it. In particular, the respective determination sections 13 and 16 check whether or not the extracted international telephone number coincides with the predetermined international telephone number at first. When the international telephone numbers coincide, the line selecting section 9 sends the object signal received by the transmitter/receiver section that has received the transmitting subscriber identification signal TSI including that international telephone number to the image output section 5 prior to the object signal received by the other transmitter/receiver section. When it is determined by the both determination sections 13 and 16 that the international telephone numbers do not coincide, the object signals received by the respective transmitter/receiver sections 11 and 14 are output in a predetermined order. It is output in an order of incoming calls or an order of output order defined in advance by the communication control sections 7 and 8, for example.

Thus, when the object signal is transmitted from the predetermined originating facsimile machine, the object signal may be output prior to the object signals from the other unspecified number of originating facsimile machines. This allows for an output waiting time from a point of time when the object signal is transmitted until a point of time when the object signal is actually output to be shortened. This may be when the object signal is transmitted from the originating facsimile machine to the facsimile machine 1 during a time when the public line of the facsimile machine 1 is congested for example. Accordingly, the time required for the communication between the originating facsimile machine and the facsimile machine 1 may be shortened.

Further, when the communication control sections 7 and 8 transmit/receive the object signal between the unspecified number of originating facsimile machines as described above, the international telephone numbers stored in each of the number storage sections 12 and 15 may be different. In this case, it is possible to arrange the configuration such that when the communication control sections 7 and 8 receive the object signals at the same time, the line selecting section 9 collects those object signals to store in the image storage section 10, or to send to the image output section 5 as one object signal. This is utilized as follows, for example.

At first, the transmission side divides an original to be transmitted into a plurality of parts and transmits each divided original to the facsimile machine 1 separately by a plurality of originating facsimile machines identified by the international telephone numbers stored in the number storage sections 12 and 15. Thus, a time required for reading the original and for creating the object signal may be shortened on the transmission side as compared to the case of transmitting the original by using only one facsimile machine. Moreover, because a quantity of signal of each object signal is less than that of the object signal created by reading the original collectively, a time required for transmitting the object signal to the receiving means from each originating facsimile machine may be shortened as compared to the case of transmitting the object signal created by reading the original collectively as it is.

The respective communication control sections 7 and 8 receive the object signals almost at the same time in the receiving facsimile machine 1. Responding to the determination result of the respective determination sections 13 and 16, the line selecting section 9 collects those object signals when both determination sections determine that the international telephone numbers coincide. Accordingly, by the both determination sections. Thereby, the object signal representing the first original is automatically created, so that the operation thereafter is the same as the case of transmitting the first original from one originating facsimile machine. Accordingly, when the original is transmitted by the above-mentioned procedure, the time required for the communication between the originating facsimile machine and the facsimile machine 1 may be shortened.

Figure 7:
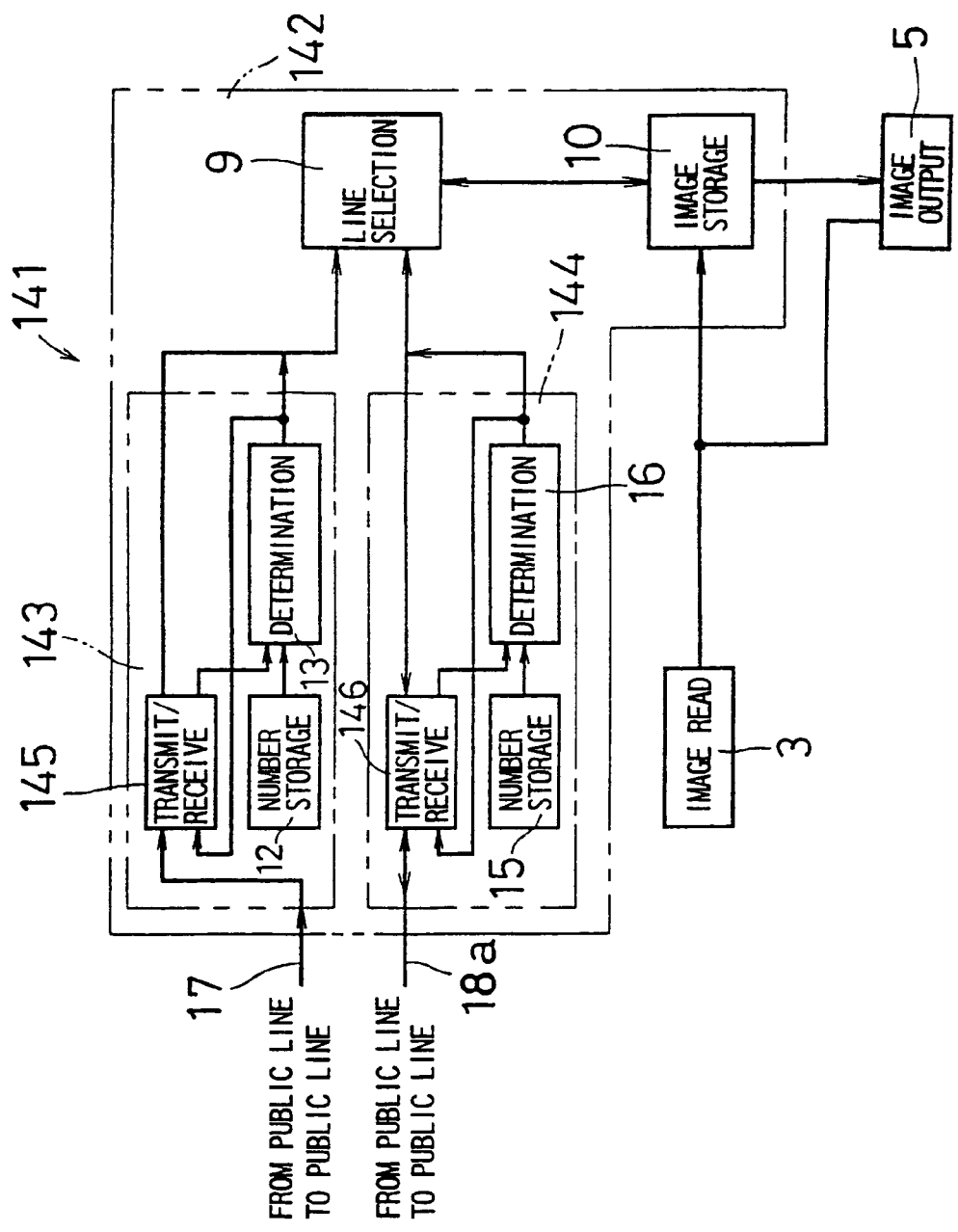
FIG. 7 is a block diagram for explaining a schematic structure of a facsimile machine 141 which is a communication apparatus according to a second embodiment of the invention.

FIG. 7 is a block diagram for explaining a schematic electrical structure of a facsimile machine 141 which is a communication apparatus according to a second embodiment of the invention. As compared to the facsimile machine 1 of the first embodiment, the facsimile machine 141 is the same with the exception that the facsimile control section 4 is replaced by a facsimile control section 142. Concrete structures and basic transmission phases of the facsimile machine 141 are also the same as those of the facsimile machine 1, so that an explanation thereof will be omitted here. In the facsimile machine 141, the same or corresponding components with those of the facsimile machine 1 will be denoted by the same reference numerals and an explanation thereof will be also omitted here.

The facsimile control section 142 comprises communication control sections 143 and 144, the line selecting section 9 and the image storage section 10. The communication control sections 143 and 144 comprise transmitter/receiver sections 145 and 146, the number storage sections 15 and 16 and the determination sections 13 and 16, respectively. The public line 17 connected to the communication control section 143 forms a channel with an originating facsimile machine for example. The public line 18a connected to the communication control section 144 is a so-called private line and forms a channel between a transferred facsimile machine for example. The transferred facsimile machine is a facsimile machine to which an object signal transmitted from the originating facsimile machine is transferred.

The transmitter/receiver sections 145 and 146 contain transmitting and receiving circuits for facsimile communication and transmit/receive object signals. When it is determined by the detemination section 13 that an international telephone number of the originating facsimile machine coincides with the international telephone number stored in the number storage section 12, the transmitter/receiver section 145 of the communication control section 143 sends the object signal from the originating facsimile machine to the transmitter/receiver section 146 of the communication control section 144 via the circuit selecting section to transmit it from the transmitter/receiver section 146 to the transferred facsimile machine.

In the facsimile machine 141, an international telephone number of a predetermined originating facsimile machine is stored in the number storage section 12. Also, an international telephone number, e.g. an extension number, of the transferred facsimile machine is stored in correspondence to the international telephone number of the originating facsimile machine in advance. When an object signal is transmitted from the predetermined originating facsimile machine to the facsimile machine 141 in this state, the facsimile machine 141 causes the transferred facsimile machine to automatically receive the object signal.

Figure 8:
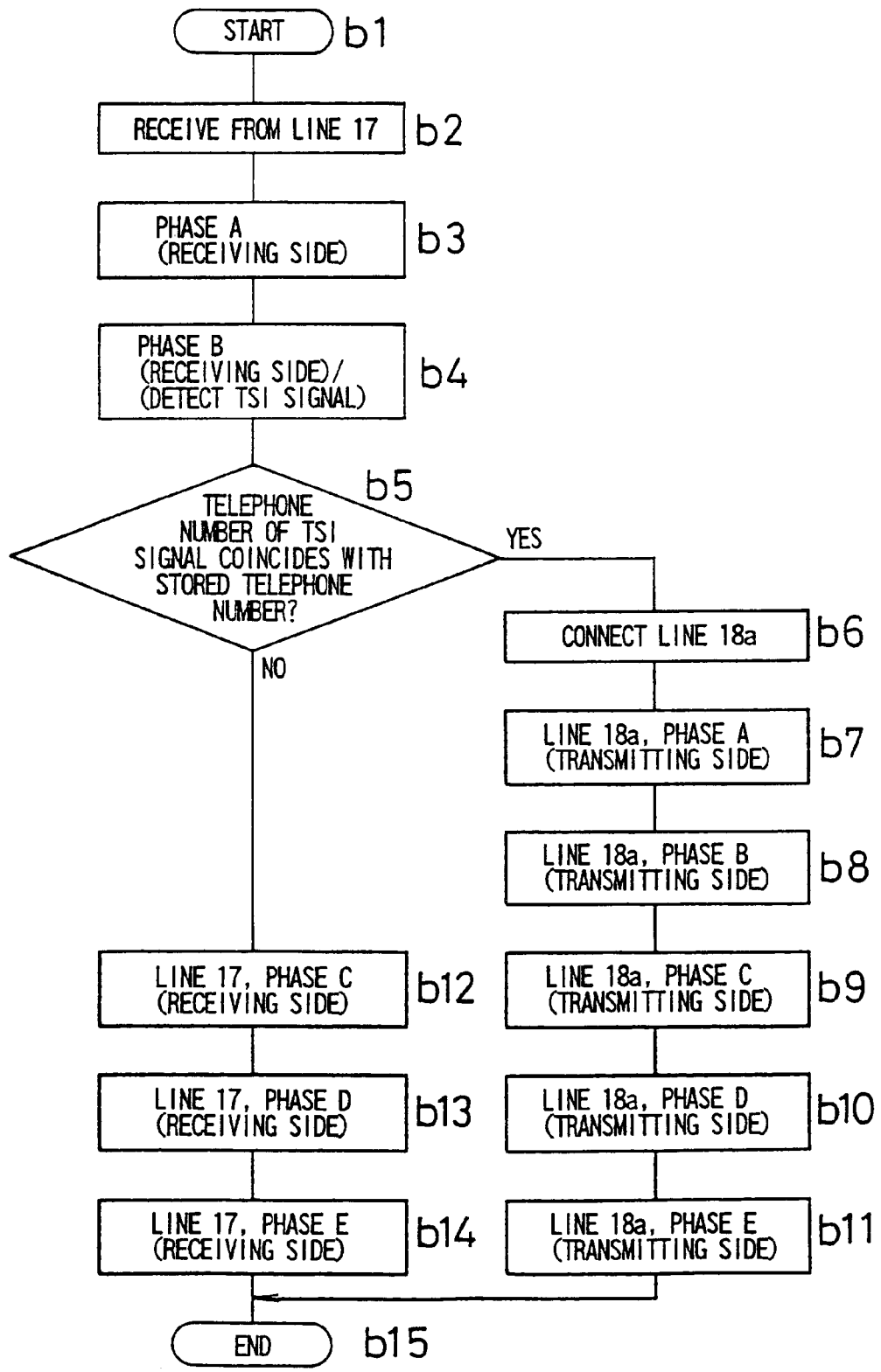
FIG. 8 is a flowchart for explaining a receiving operation of the facsimile machine 141.

FIG. 8 is a flowchart for explaining a receiving operation performed by the communication control sections 143 and 144. The communication control section 143 waits in a standby state in which it can receive signals from an originating facsimile machine. When a calling tone TEL is given in this state from the originating facsimile machine, the process advances from Step b1 to Step b2 to confirm that the channel is connected via the public line 17. Then, the process advances to Step b3. In Step b3, the transmitter/receiver section 145 sets the call and establishes the channel by transmitting/receiving signals in accordance to the processing procedure of the receiving side in Phase A described above. Next, the transmitter/receiver section 145 performs the preprocessing by transmitting/receiving signals in accordance to the processing procedure of the receiving side in Phase B described above in Step b4. During the pre-processing, a transmitting subscriber identification signal TSI is given from the originating facsimile machine to the facsimile machine 141.

Then, the determination section 13 extracts an international telephone number of the originating communication apparatus from the transmitting subscriber identification signal TSI in Step b5. Next, the determination section 13 reads a predetermined international telephone number from the number storage section 12 to determine whether or not the read international telephone number coincides with the extracted international telephone number. When it is determined that the both international telephone numbers coincide, the process advances from Step b5 to Step b6 to perform the transfer processes in Steps b6 through b11. During the transfer processes, the transmitter/receiver section 145 continues the operation for receiving the object signal transmitted from the originating facsimile machine in accordance to the processing procedure of the receiving side in Phases C through E. Thereby, the transmitter/receiver section 145 receives the object signal and disconnects the channel after reception of the object signal.

In particular, the transfer process is performed as follows. At first, the transmitter/receiver section 145 activates the transmitter/receiver section 146 in Step b6. The transmitter/receiver section 146 obtains the international telephone number of the transferred facsimile machine defined as corresponding to the international telephone number determined as coinciding by the determination section 13, and makes a call to the transferred facsimile machine via the public line 18a. That is, it outputs a calling tone TEL to the transferred facsimile machine. Next, the transmitter/receiver section 146 sets the call and establishes the channel by transmitting/receiving signals in accordance to the processing procedure of the transmitting side of Phase in Step b7. Responding to that, the transferred facsimile machine sets the call and establishes the channel in Phase A. Next, the transmitter/receiver section 146 performs the pre-processing by transmitting/receiving signals in accordance to the processing procedure of the transmitting side of Phase B in Step b8.

Next, the object signal received by the transmitter/receiver section 145 is supplied to the transmitter/receiver section 146 and the transmitter/receiver section 146 transmits the object signal to the transferred facsimile machine in accordance to the processing procedure of the transmitting side of Phase C in Step b9. Further, after transmitting the object signal, the transmitter/receiver section 146 performs the post-processing by transmitting/receiving signals in accordance to the processing procedure of the transmitting side of Phase D in Step b10. After ending the post-processing, the transmitter/receiver section 146 disconnects the channel by transmitting/receiving signals in accordance to the processing procedure of the transmitting side of Phase E in Step b11. Then, the process ends in Step b15. When the object signal is transferred to the transferred facsimile machine as described above, the object signal is printed on a recording sheet by an image output section of the transferred facsimile machine.

When it is determined that the read international telephone number does not coincide with the extracted international telephone number in Step b5, the process advances from Step b4 to Step b12. In Step b12, the transmitter/receiver section 145 receives the object signal by transmitting/receiving signals in accordance to the processing procedures of the receiving side in Phase C described above. Further, after ending reception of the object signal, the transmitter/receiver section 145 performs the post-processing by transmitting/receiving signals in accordance to the processing procedures of the receiving side in Phase D in Step b13. After ending the post-processing, the transmitter/receiver section 145 disconnects the channel by transmitting/receiving signals in accordance to the processing procedures of the receiving side in Phase E in Step b14. The process ends in Step b15. When the object signal is not transferred as described above, the object signal is printed on a recording sheet by the image output section 5 of the facsimile machine 1. Accordingly, the communication control section 143 transfers the object signal from the originating facsimile machine identified by the international telephone number stored in the number storage section 12 automatically to the transferred facsimile machine.

Thereby, the facsimile machine 141 operates as a relay facsimile machine between the predetermined originating facsimile machine and the transferred facsimile machine. Accordingly, the object signal is automatically transferred without requiring the manipulation for transferring the object signal to be performed by the operator of the facsimile machine 141. Because the operator needs not to manipulate the facsimile machine to operate the facsimile machine 141 as the relay facsimile machine, the manipulation of the operator may be simplified. Further, when the facsimile machine connected to the communication control section 144 via the public line 18a is assumed to be an originating facsimile machine and the facsimile machine connected to the communication control section 143 is assumed to be a transferred facsimile machine, this transfer operation may be performed just by switching the operations of the communication control sections 143 and 144 in the above-mentioned flowchart.

Further, the transferred facsimile machine is connected to the facsimile machine 141 via the public line which is a private line in the facsimile machine 141 described above. Thus, the facsimile machine 141 may be connected with the transferred facsimile machine even when the facsimile machine 141 does not have a separate communication path different from the public line, i.e. a so-called extension communication path. Accordingly, even when the facsimile machine 141 is not provided with a communication path such as an extension line, this connection architecture allows a facsimile machine to be connected similarly to the case when the facsimile machine is connected via the extension communication path and an object signal to be transmitted/received each other.

When the facsimile machine 141 is provided with the extension communication path, a relay circuit for connecting/disconnecting the transmitter/receiver section 145 to the extension communication path may be provided. In this case, when it is determined that the international telephone numbers coincide in Step b5, it is possible to connect the transmitter/receiver section 145 with the communication path by the relay circuit and to supply the received object signal to the transferred facsimile machine via the communication path during when the transmitter/receiver section 145 transmits/receives signals based on the processing operation of the receiving side of Phases C through E instead of operating the transmitter/receiver section 146. When the machine is constructed as described above, the above-mentioned receiving operation may be performed even when only one public line is stored in the facsimile machine 141.

Figure 9:
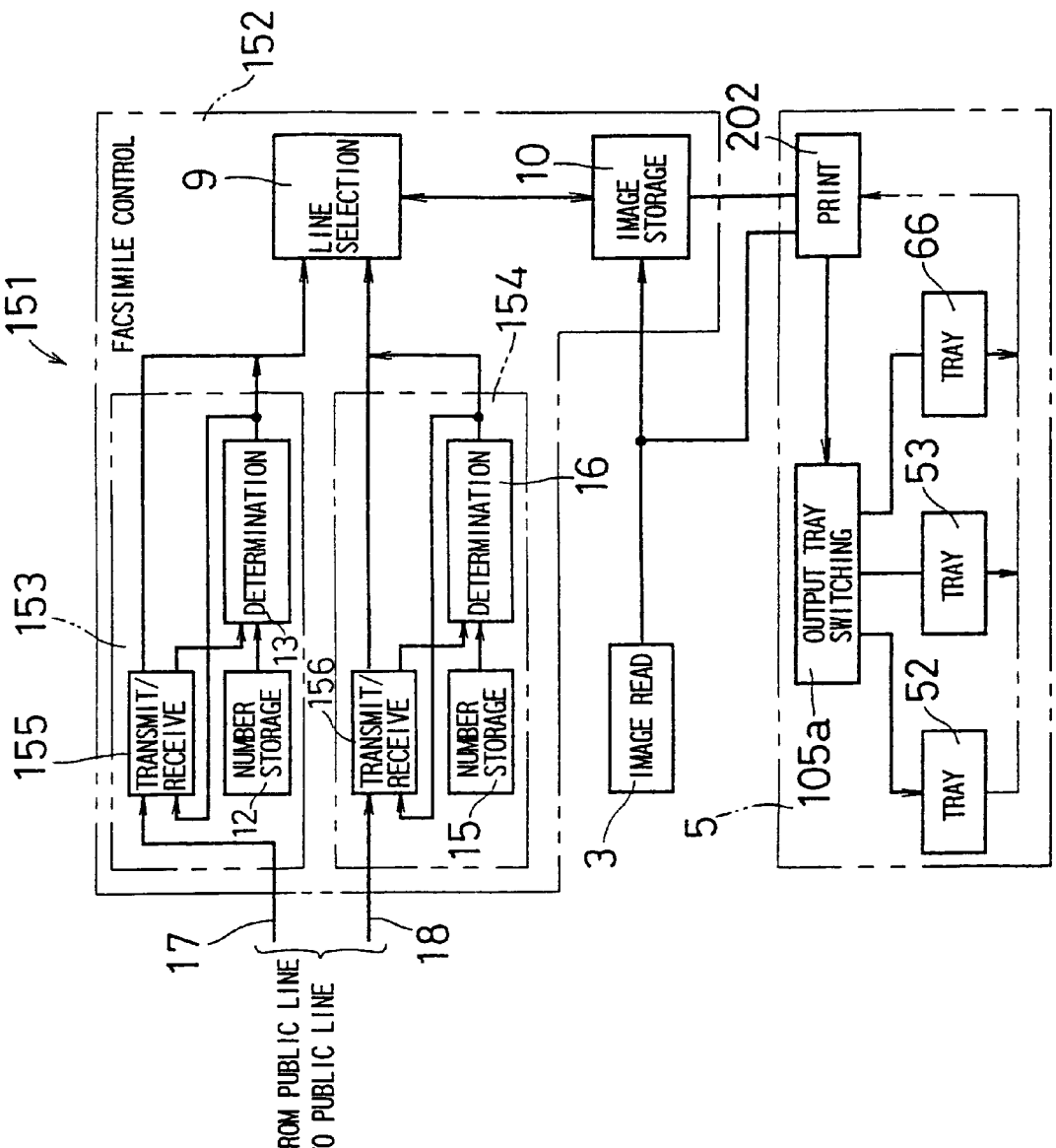
FIG. 9 is a block diagram for explaining a schematic structure of a facsimile machine 151 which is a communication apparatus according to a third embodiment of the invention.

FIG. 9 is a block diagram for explaining a schematic electrical structure of a facsimile machine 151 which is a communication apparatus according to a third embodiment of the invention. As compared to the facsimile machine 1 of the first embodiment, the facsimile machine 151 is the same except that the facsimile control section 4 is replaced by a facsimile control section 152. Concrete structures and basic transmission phases of the facsimile machine 151 are also the same with those of the facsimile machine 1 of the first embodiment, so that an explanation thereof will be omitted here. The same or corresponding components of the facsimile machine 151 with those of the facsimile machine 1 will be denoted by the same reference numerals and an explanation thereof will be also omitted here.

The facsimile control section 152 comprises communication control sections 153 and 154, the line selecting section 9 and the image storage section 10. The communication control sections 153 and 154 comprise transmitter/receiver sections 155 and 156, the number storage sections 15 and 16 and the determination sections 13 and 16, respectively. The transmitter/receiver sections 155 and 156 contain transmitting and receiving circuits for facsimile communication, respectively. When it is determined by the determination section 13 that an international telephone number of an originating facsimile machine coincides with the international telephone number stored in the number storage section 12, the transmitter/receiver sections 155 and 156 read dedicated predetermined printing information corresponding to the international telephone number to supply a recording sheet from the tray or the feeder section specified by the dedicated printing information among the first and second trays 52 and 53 and the manual feeder section 66 to the image forming section 81 to print the object signal on the supplied recording sheet.

Figure 10:
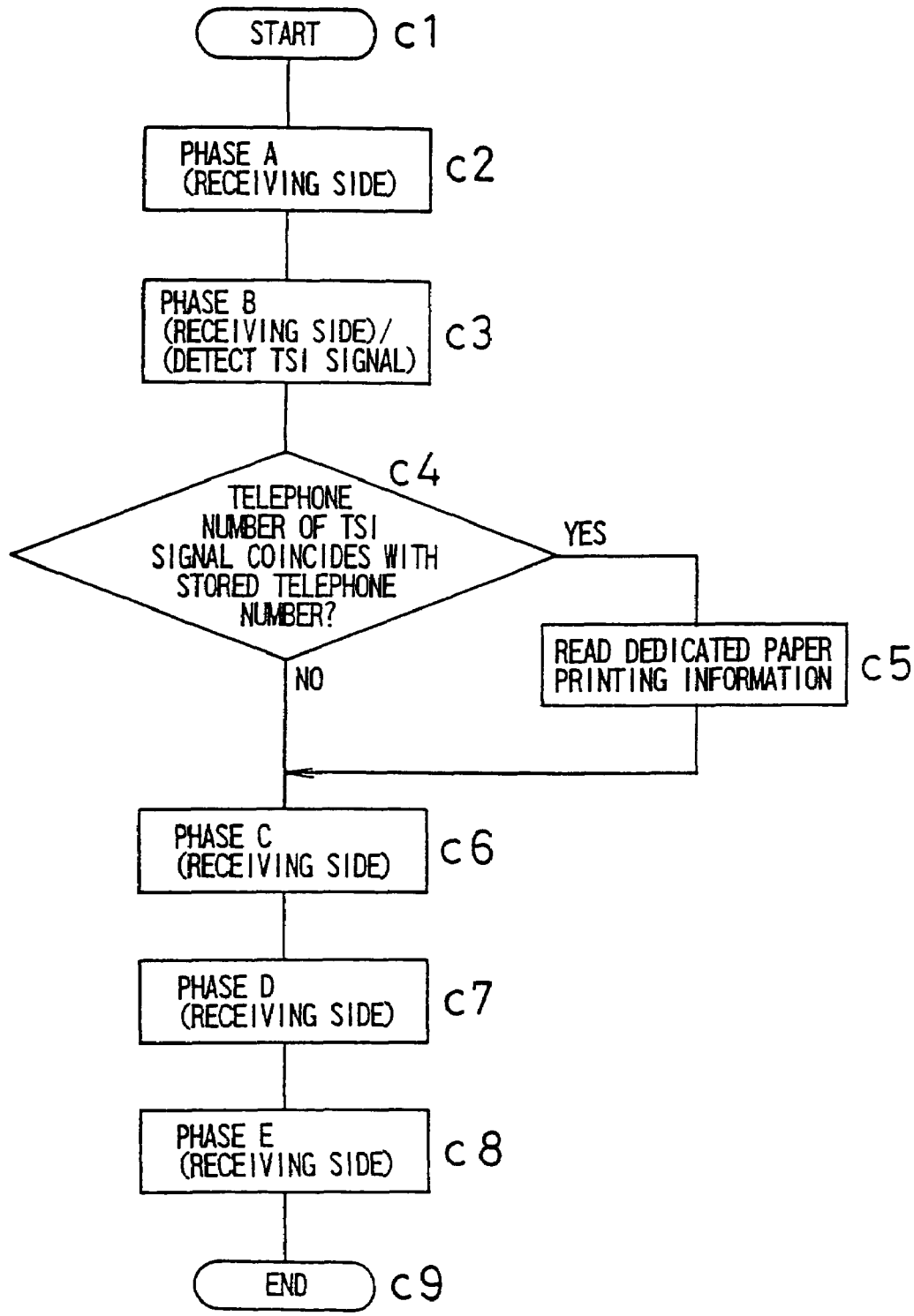
FIG. 10 is a flowchart for explaining a receiving operation of the facsimile machine 151.

FIG. 10 is a flowchart for explaining a receiving operation performed by the communication control section 153. The communication control section 153 waits in a standby state in which it can receive signals from the originating communication apparatus. When a calling tone TEL is given in this state from the originating communication apparatus, the process advances from Step c1 to Step c2. In Step c2, the transmitter/receiver section 155 sets the call by transmitting/receiving signals in accordance to the processing procedure of the receiving side in Phase A described above. Next, the transmitter/receiver section 155 performs the preprocessing by transmitting/receiving signals in accordance to the processing procedure of the receiving side in Phase B described above in Step c3. During the pre-processing, a transmitting subscriber identification signal TSI is given from the originating facsimile machine to the facsimile machine 151.

Then, the determination section 13 extracts an international telephone number of the originating communication apparatus from the transmitting subscriber identification signal TSI in Step c4. Next, the determination section 13 reads a predetermined international telephone number from the number storage section 12 to determine whether or not the read international telephone number coincides with the extracted international telephone number. When it is determined that the both international telephone numbers coincide, the process advances from Step c4 to Step c5. In Step c5, the transmitter/receiver section 155 reads the dedicated printing information corresponding to the international telephone number from the number storage section 12 and supplies to the output tray switching section 105a via the line selecting section 9, the image storage section 10 and the printing section 202. The output tray switching section 105a selectively operates the stacking members 54 and 55 of the first and second trays 52 and 53, the manual feeder section 66 and each roller of the sheet feeder section 51 in the supply section 201 such that the recording sheet is supplied from the first or second trays 52 or 53 or the manual feeder section 66 specified by the dedicated printing information. After supplying the dedicated printing information, the process advances from Step c5 to Step c6.

When it is determined that the both international telephone number do not coincide in Step c4, the output tray switching section 105a selectively operates the stacking members 54 and 55 and each roller such that the recording sheet is supplied from either one of the first and second trays 52 and 53 and the manual feeder section 66 to the image forming section 81. From among the first and second trays 52 and 53 and the manual feeder section 66 is selected, for example, what is defined in the initialization of the facsimile machine 151, or what is specified by the operator who operates the manipulator section 30 of the facsimile machine 151. In this case, the process advances directly from Step c4 to Step c6.

In Step c6, the transmitter/receiver section 155 receives the object signal by transmitting/receiving signals in accordance to the processing procedures of the receiving side in Phase C described above. This object signal is printed on the recording sheet in the image output section 5 in parallel with the receiving operation for example. Further, after ending reception of the object signal, the transmitter/receiver section 155 performs the post-processing by transmitting/receiving signals in accordance to the processing procedures of the receiving side in Phase D of Step c7. After ending the post-processing, the transmitter/receiver section 155 disconnects the channel by transmitting/receiving signals in accordance to the processing procedures of the receiving side in Phase E of Step c8. The process ends in Step c9.

Therefore, the object signal from the predetermined originating facsimile machine can be printed automatically on the recording sheet of a type decided in advance in the printing section 202. The recording sheet is selected automatically without requiring the manipulation for switching the type of the recording sheet, which is otherwise performed by the operator of the facsimile machine 151. Therefore, the manipulation to be performed by the operator can be simplified. It may be preferably used as follows, for example.

When the facsimile machine 151 is installed in Japanese territory and the originating facsimile machine is outside Japanese territory, sheets of paper in inch units (i.e., 8½"×11" paper) are used many times as an original to be read by the originating facsimile machine. Then, when an international telephone number of the originating facsimile machine is stored in the number storage section 12, dedicated printing information for selecting a tray storing the recording sheets in inch units is also stored corresponding to the international telephone number. Thereby, an object signal transmitted from the originating facsimile machine may be printed on the recording sheet in the unit of inch and an object signal transmitted from another originating facsimile machine may be printed on a recording sheet of size A for example.

When the facsimile machine 151 is arranged such that the line selecting section 9 collects object signals received by the communication control sections 153 and 154 in the same time as one object signal as described with regard to the facsimile machine 1 of the first embodiment and when the recording sheets corresponding to the international telephone numbers stored in the number storage sections 12 and 15 of the communication control sections 153 and 154 are the same kind, those received object signals may be printed in the same format.

Thus, the facsimile machines 1, 141 and 151 of the first through third embodiments alter the receiving and output operations corresponding to the international telephone number of the originating facsimile machine which transmits the object signal. Because these facsimile machines 1, 141 and 151 contain the structure of the copying machine, they include a number of performable processing operations regarding printing of the object signal in the image output section 5, as compared to that of an image output section of the conventional facsimile machines. Therefore, it is also possible to configure the facsimile machine such that a decision whether to perform those processing operations or not is included in the receiving and output operations corresponding to the international telephone number. Further, the various receiving and output operations described in the first through third embodiments may be performed by combining them arbitrarily. For example, it is possible to arrange so as to perform all of the three kinds of receiving operations and the two kinds of output operations by one facsimile machine. Thereby, the usability of the facsimile machine may be improved further.

For instance, it is possible to arrange the facsimile machine such that when an object signal is transmitted from an originating facsimile machine identified by an international telephone number, its object signal is printed on both sides of the recording sheet. Thereby, a consumption of the recording sheets on which the object signal is printed may be reduced. It is also possible to print the object signal repeatedly by a plurality of times to create a plurality of copies of recording sheets and to bundle those recording sheets per copy by a stapler. By processing as described above, the conventional operation of preparing a required number of copies of a document by copying the recording sheets on which the object signals are printed by the facsimile machine may be performed automatically corresponding to the international telephone number. Accordingly, the method for preparing a document may be automatically altered corresponding to the international telephone number, i.e. the transmitter of the object signal.

The facsimile machines of the first through third embodiments are examples of the inventive communication apparatus and may be embodied in various ways as long as their main operation is the same. Specifically, the detailed operation of each section may be realized by other operations as long as the same processing result can be obtained. Further, the inventive communication apparatus may be realized by a communication apparatus other than the facsimile machine as long as it has the communication mode in which an identification signal for identifying a transmitting communication apparatus is transmitted prior to the transmission of the object signal. For example, it may be realized in a telephone communication which includes a service of transmitting an originating number to the receiving telephone set and it is possible to switch whether or not to record calls of an automatic answering telephone set corresponding to the telephone number of the transmission side.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A communication apparatus, comprising:
    a communication device for receiving an identification signal from an originating communication apparatus, the identification signal identifying the originating communication apparatus, and performing an output operation when the received identification signal from the originating communication apparatus coincides with a pre-stored identification signal, wherein
    a number of copies to be repeatedly printed is pre-stored in the communication apparatus in correspondence to the pre-stored identification signal, and
    said output operation performed when the received identification signal from the originating communication apparatus coincides with the pre-stored identification signal includes an operation of repeatedly printing, on recording sheets, a plurality of copies of an image data signal representing the entire document being received to form a plurality of groups of the entire document received, with the number of groups formed of the entire document corresponding to the number of copies to be repeatedly printed that is stored in correspondence to said pre-stored identification signal.

2. The communication apparatus according to claim 1, wherein a process of bundling each group of copies one by one with a staple is performed after said output operation.

* * * * *